(12) United States Patent
Johnson et al.

(10) Patent No.: US 6,251,493 B1
(45) Date of Patent: *Jun. 26, 2001

(54) VIBRATION AND SHOCK ATTENUATING ARTICLES AND METHOD OF ATTENUATING VIBRATIONS AND SHOCKS THEREWITH

(75) Inventors: Gordon G. Johnson, Lake Elmo; Donald T. Landin, Eagan; Michael A. Jung, Inver Grove Heights; Jeffrey W. McCutcheon, Eagan, all of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/629,210

(22) Filed: Apr. 8, 1996

(51) Int. Cl.$^7$ .................................................. B32B 33/00
(52) U.S. Cl. ............................. 428/71; 428/76; 428/220; 428/354
(58) Field of Search ................................ 428/71, 76, 354, 428/220

(56) References Cited

U.S. PATENT DOCUMENTS

| | | | |
|---|---|---|---|
| 3,572,798 | * 3/1971 | Kunevicius . | |
| 4,288,490 | 9/1981 | Alfter et al. | 428/315 |
| 4,346,205 | * 8/1982 | Hiles | 428/71 |
| 4,356,676 | * 11/1982 | Hauptman | 428/71 |
| 4,584,225 | * 4/1986 | Adelman | 428/71 |
| 4,839,397 | 6/1989 | Lohmar et al. | 521/159 |
| 4,867,748 | 9/1989 | Samuelsen . | |
| 5,133,821 | 7/1992 | Jensen . | |
| 5,160,780 | 11/1992 | Ono et al. | 428/220 |
| 5,224,000 | 6/1993 | Casey et al. | 360/105 |
| 5,427,864 | 6/1995 | Hikasa et al. . | |
| 5,552,195 | * 9/1996 | Cook | 428/31 |

FOREIGN PATENT DOCUMENTS

| | | |
|---|---|---|
| 03081124 | 4/1991 | (JP) . |
| 05147096 | 6/1993 | (JP) . |
| 5-147096 | 6/1993 | (JP) . |

OTHER PUBLICATIONS 3M brochure #70–0704–5660–6 (361.5)BE entitled Bumpon™to Protective Products, 3M ITSD, St. Paul, Minnesota, 1996 (6 pages).

3M brochure #70–0706–5999–3 (36.5)OLY entitled Bumpon ™Protective Products, 3M ITSD, St. Paul, Minnesota, 1996 (2 pages).

3M brochure #70–0705–7698–1 entitled Bumpon Protective Products, 5200•5400 Series, 3M ITSD, St. Paul, Minnesota, 1994 (2 pages).

3M brochure #70–0706–5787–8 RPI entitled Bumpon ™Protective Products, Top–Hat Design, SJ–6115•SJ–6125, 3M ITSD, St. Paul, Minnesota, 1996 (6 pages).

3M brochure #70–0706–5920–9 entitled Noise and Vibration Control Systems, 3M Vibration Control, St. Paul, Minnesota, 1995.

\* cited by examiner

*Primary Examiner*—Jenna Davis
(74) *Attorney, Agent, or Firm*—James J. Trussell

(57) ABSTRACT

The present invention relates to a vibration attenuating article that has a non-tacky film covering enclosing all or a significant portion of the surface of a vibration attenuating material, wherein at least a portion of the vibration attenuating surface covered by the film covering is a three dimensional surface. A layer of adhesive must be present on at least a portion of the exterior film covering when all of the vibration attenuating material is covered by the exterior film covering.

31 Claims, 8 Drawing Sheets

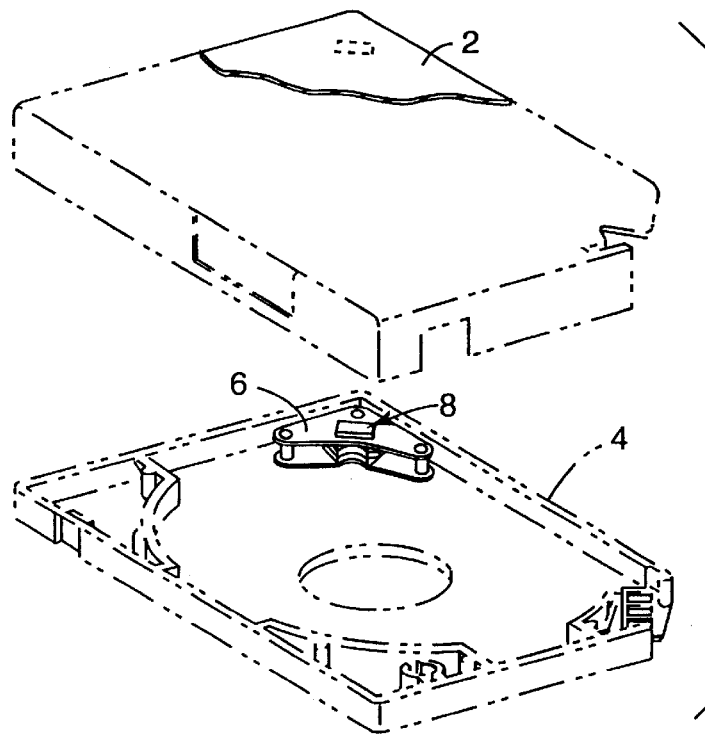
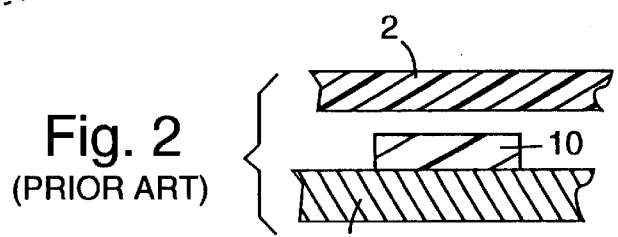
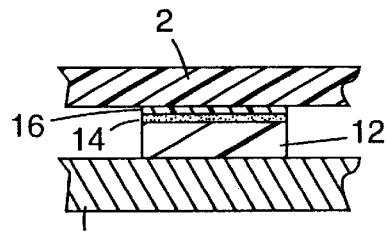
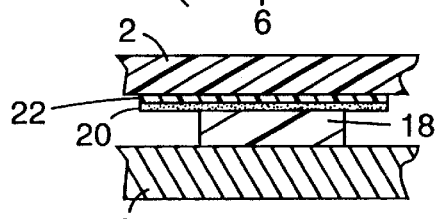
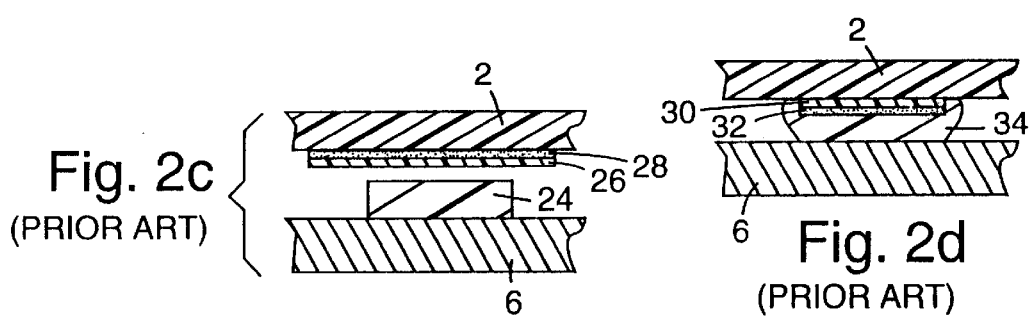
Fig. 1 (PRIOR ART)
Fig. 2 (PRIOR ART)
Fig. 2a (PRIOR ART)
Fig. 2b (PRIOR ART)
Fig. 2c (PRIOR ART)
Fig. 2d (PRIOR ART)

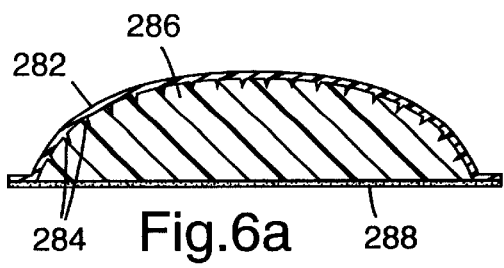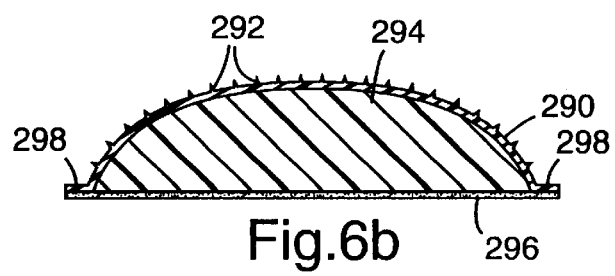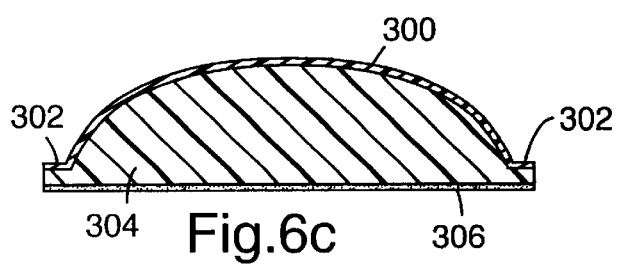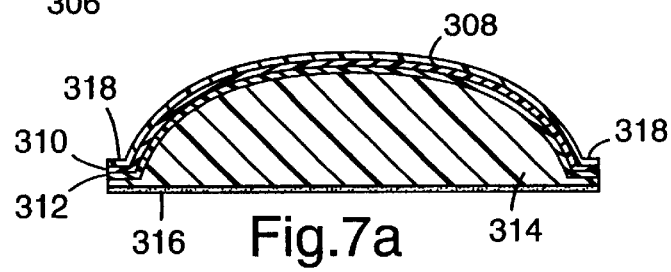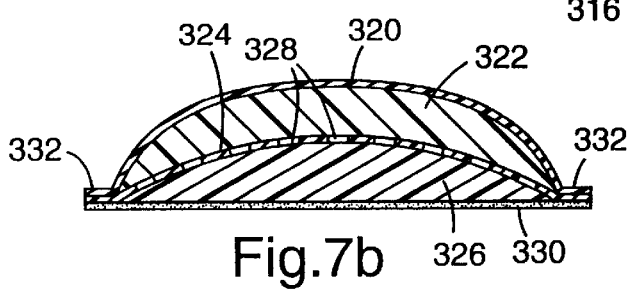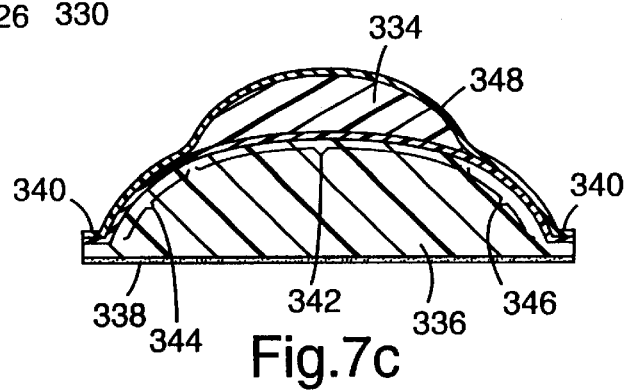

though still not eliminating them completely. A typical disk drive needs to be very clean, but its use of adhesives for assembly is a potential source of airborne contamination. Thus, it is essential that the entire damper, polymeric film and adhesive, have low outgassing and particulate emissions.

US 6,251,493 B1

VIBRATION AND SHOCK ATTENUATING ARTICLES AND METHOD OF ATTENUATING VIBRATIONS AND SHOCKS THEREWITH

FIELD OF THE INVENTION

The present invention relates to a one-piece vibration attenuating article that has a non-tacky film covering enclosing all or a significant portion of the surface of a vibration attenuating material, wherein at least a portion of the vibration attenuating material's surface covered by the film covering is a three dimensional surface. The articles can be used in numerous applications where vibration or shock attenuation is required, including, but not limited to, disk drive applications, automotive applications, and electronics applications.

BACKGROUND OF THE INVENTION

Vibrations and/or shocks can excite resonant frequencies in structures. Damping and/or isolation can be used to reduce the vibration and shock effects.

Applications where vibration and shock control are particularly important include disk drive applications, actuator voice coil motor applications, computer shock isolation applications, car applications, shock isolator applications for drawers or doors, and the like.

As a specific example, resonant vibrations or shocks in a disk drive can be caused by the read-write actuator voice coil motor assembly. An actuator is used in a disk drive to very quickly and precisely position the read/write element over the data track of a spinning disk. The actuator voice-coil motor design most often used to position the transducer can often generate vibrations that lead to excessive acoustical noise that is irritating to users of the disk drive. These vibrations can also impair the positioning or stability of the read-write transducer over the desired data track, thus reducing the drive's performance.

FIG. 1 illustrates a partial exploded view of a disk drive with only a few key features shown for clarity. FIG. 1 shows top cover 2, a bottom cover 4, and a top magnetic plate of the voice coil motor 6. A damper which would be used to damp vibrations within the disk drive could be positioned on the top magnetic plate of the voice coil motor 6. The damper location is indicated as 8. A more detailed description of a disk drive and actuator voice coil motor is found in U.S. Pat. No. 5,224,000.

One method of damping such an actuator is to use a damper which is a die cut part of damping material that is placed in key areas which experience vibration to add damping to the actuator motor assembly. (See FIG. 2 where the die cut part of damping material is represented by 10, the top cover of the disk drive is 2, and the top magnetic plate of the voice coil motor is 6.) Typically, the damper is placed between a portion of the motor assembly and an outer surface, such as the drive's cover or base. Known dampers often use a damping material with a tacky surface associated with the polymer that can make their use difficult.

Known die cut dampers are typically from 0.025 mm (1 mil) thick to over 3.81 mm (150 mils) thick. These die cut dampers have essentially flat top and bottom surfaces and straight die cut side edges that are essentially perpendicular to the top and bottom surfaces of the damper. The vibration damper may optionally have a polymeric film layer, for example, a die cut piece of polyester or polyethylene film, attached to the damper with a pressure sensitive adhesive.

The add on polymeric film covers only the top portion of the flat top damper. This polymeric film layer can be the same size as the damper top surface area or extend past the top surface edges. (See FIGS. 2a and 2b, respectively. In FIG. 2a the polyethylene film is 16, the pressure sensitive adhesive is 14, the damping material is 12, the disk drive cover is 2, and the top magnetic plate of the voice coil motor is 6. In FIG. 2b the polyethylene film is 22, the pressure sensitive adhesive is 20, the damping material is 18, the disk drive cover is 2, and the top magnetic plate of the voice coil motor is 6.) Neither the surface of the film in contact with the damper, nor the damper surface with which the film is in contact, is three dimensional. The films do not offer any significant damping benefit as compared to the damping material and the main benefit the film does provide is to provide a tack-free surface on a single flat surface of the damper that will not bond to other surfaces it contacts.

Two-piece "damping" constructions that use a damper and a separate die cut film part have been used in disk drive systems where a damper (a die cut section of damping polymer) has a film (a polyethylene polymeric film with a pressure sensitive adhesive on one side) attached to a surface opposite from that which the damper is placed on, such that when the drive is assembled, the damper and film are in contact (See FIG. 2c, wherein the polyethylene polymeric film is 26, the pressure sensitive adhesive is 28, the damping film is 24, the top cover of the disk drive is 2, and the top magnetic plate of the voice coil motor is 6). The film provides a surface to which the damper will have a fairly weak bond so that the drive can be easily opened and reworked. The surface of this film in contact with the damper is not three dimensional, nor does it contact a three dimensional surface of the damper.

SUMMARY OF THE INVENTION

These known dampers provide for significant reductions in acoustical noise as well as vibration levels. However, problems with these known dampers include the inability to use low Tg damping materials effectively because they may be tacky at room temperature or at disk drive use temperatures. Additional problems with the current dampers include poor outgassing, difficulty in dimensional control, etc. These and other problems are expanded upon in detail hereafter:

1) Known dampers not used in conjunction with a polymeric film attached opposite the dampers (See FIG. 2) can build a strong bond to the surfaces they come into contact with (such as such as the cover or base surface of a drive). This makes reworking of the drive difficult as the drive may be difficult to reopen due to the strong bond which may have been formed.

2) A damper that has a film attachment coextensive with the top surface of the damper, can experience "blooming" whereby the damping polymer expands past the edge of the film during use creating a situation where the damping polymer can still create a significant bond in an undesired location. When compressed into position, the damping polymer expands around the film allowing a bond to form to an undesired surface (See FIG. 2d wherein the polymeric film is 30, the pressure sensitive adhesive is 32, and the damping polymer is 34). Using thicker films to limit this is not practical for thick dampers and could make the dampers difficult and more costly to manufacture.

3) Dampers with a polymeric film (such as a polyester film) extended over the edges of the damper (See FIG. 2b) are difficult to handle and costly to manufacture as the larger film is die cut and attached via pressure sensitive adhesive to the damper or the damper is pre-cut and subsequently attached via pressure sensitive adhesive to the film.

4) Dampers that use a separate film die cut part attached to an opposite surface in the drive (to prevent high degree of bonding) prior to assembly of the drive require an additional part to manufacture and apply to the drive (See FIG. 2c).

5) Often low Tg damping materials have a tacky surface associated with the damping material, unless a sufficient degree of crosslinking is present in the polymer to render them tack-free. The polymers that have been rendered tack-free by high levels of crosslinking (greater than or equal to about 0.5%) have a higher rubbery region modulus than a similar polymer not so highly crosslinked. The mechanical strength of the damping polymer may also be reduced due to the high level of crosslinking.

These highly crosslinked tack-free polymers will not stress relax as quickly or to as low a level as less highly crosslinked damping polymers. This retention of stress in highly crosslinked polymers is detrimental in applications where the damper is initially stressed upon application and to function properly, the damper needs to stress relax (e.g., over the range of thickness stack-up assembly tolerances for the actuator motor assembly, the high crosslinked or high Tg damping polymer may not have sufficient relaxation in the polymer to prevent cover bowing once the cover is attached to the base of the drive and the damper is compressed). A tack-free damping polymer may not meet all the application needs as the presence of crosslinking may reduce the peak damping of the damping polymer at both room and operating temperatures.

In addition, these dampers require a pressure sensitive adhesive to aid in attaching the damper to the drive since the damping polymer is not tacky.

6) The current dampers which tend to be tacky at 25 to 65° C. (See FIGS. 2, 2a, 2b, and 2c) can collect contamination easily and are difficult to clean either by hand or via automatic cleaning systems.

7) Current dampers (See FIGS. 2, 2a, 2b, and 2c) can have a high degree of outgassing. This can be a problem for the enclosed environment of the disk drive where outgassed materials can lead to drive reliability problems. The current dampers have a significant exposed surface area inside the drive and are often the largest source of organic material in the drive. Current dampers may be pre-outgassed in an oven by heating the dampers to an elevated temperature for a period of time. But this adds cost and complexity to the manufacturing process, including the potential for the dampers to become contaminated.

8) The current dampers (See FIGS. 2, 2a, 2b, and 2c) can be difficult to handle as preferred damping polymers tend to be somewhat tacky at room temperature and most are tacky at drive operating temperatures. Automated placement of such dampers can be difficult and costly due to the damper's tacky characteristics.

9) The shapes of the current preferred dampers (See FIGS. 2, 2a, 2b, and 2c) are limited as a die cutting process is used to attain the length (X) and width (Y) of the damper. The material used for the damper, especially as the construction becomes thicker and the polymer tacky, can be difficult to remove from the excess damping material after die cutting. This excess damping material, or "weed", removal problem can limit the dampers' shapes. Dampers of square and rectangular shapes can be obtained, but other shapes such as round, triangular or "peanut" shapes can be difficult to obtain as the damper thickness increases. Sharp cornered or small radius dampers are also very difficult to manufacture and can limit the dampers aspect ratio for thickness versus X or Y dimension and also corner radius tolerances. Dimensional control of length and width is more difficult as the damper becomes thicker and tolerances that can be held become greater as the die cut damper becomes thicker.

10) The exposed damping polymers of a damper can be oxidized at elevated temperature for short times or medium temperatures at long times. Oxidation can change the damping properties of the damper and decrease the benefit of the damper.

11) The exposed damping material of a damper can be exposed to harsh environments from the air or solutions it may come into contact with during manufacture or use. These harsh mediums can react with the damping polymer to reduce the benefit of the damper. In addition, reactions between the damping material and the harsh environment can create secondary organic components that have a negative effect on other materials near the dampers use. Furthermore, components or agents used in the damping material manufacture may escape from the damper and have negative effects on materials near the damper's use location. For example, if the damping material uses a catalyst that can be leached from the damping material, it can cause detrimental reactions to occur elsewhere in the area near the damper's use location. For example, a component that leaches or outgasses onto the storage disk's surface from the damping material could lead to corrosion of the disk surface area.

12) The exposed damping material of current dampers does not have a high degree of wear or abrasion characteristics. This limits the dampers use to applications where the damper is not exposed to abrasive or wear type environments. Wear or abrasion could be induced by repeated contact of the damper to other objects or exposure to a flow of material (fluids such as air, water, etc.).

The mechanism by which current dampers dissipate undesirable energy by damping resonant vibrations, involves deformation or straining of the damping material. That is, when the structure that the damper is applied to is subjected to cyclic loading, for example, the damping material is subjected to tension-compression deformation and dissipates the energy through an extensional strain mechanism. In addition, damping can occur by energy dissipation from the damping material via a shear mechanism that results from constraint created by the damper being placed between two structures (for example, an actuator motor and cover or base). The dampers can also act as isolators by reducing the vibration transmitted from a vibration or shock source to the structure on which the dampers are being used. The peak shock and/or vibration energy or peak acceleration is reduced by use of the damper.

Although the current dampers used in drives are reasonably effective, the problems in using the dampers with a tacky damping material can be difficult and as the drive requirements for cleanliness, outgassing, ease of application, etc. become more restrictive these problems could limit the use of the dampers. Thus, an alternative approach is needed to damp vibrational or shock energy without negative effects of the current dampers.

SUMMARY OF THE INVENTION

The present invention provides a novel attenuating article that can overcome the negative aspects of the current dampers, and even offer the potential for improved damping and isolation performance.

The novel article of the invention comprises:

(a) a vibration attenuating material, wherein the vibration attenuating material has a storage modulus greater than about $6.9\times10^3$ Pascals and a loss factor greater than about 0.01 at 25° C. and 1 Hertz, wherein the vibration attenuating material has a surface and an interior;

(b) an exterior film covering, wherein the exterior film covering film has a tensile modulus greater than about $6.9\times10^3$ Pascals at 25° C. and 50% relative humidity, wherein the exterior film covering comprises one or more of the following:
  (i) a film;
  (ii) a film segment;

wherein the vibration attenuating material surface is at least partially enclosed by the exterior film covering;

wherein an inner surface of the exterior film covering conforms to the surface of the vibration attenuating material that it is at least partially enclosing;

wherein at least a portion of the surface of the enclosed vibration attenuating material has a three dimensional shape;

(c) optionally one or more interior film dividers, wherein each interior film divider has a tensile modulus greater than about $6.9\times10^3$ Pascals at 25° C. and 50% relative humidity, wherein each interior film divider comprises one or more of the following:
  (i) a film;
  (ii) a film segment;

wherein each interior film divider separates at least a portion of the vibration attenuating material from another portion of the vibration attenuating material; and (d) optionally a layer of adhesive coated on one or more of the following:
  (i) at least a portion of a surface of the exterior film covering;
  (ii) at least a portion of a surface of any interior film divider, if present;
  (iii) at least a portion of any vibration attenuating material which is not enclosed by the exterior film covering.

wherein when the vibration attenuating material is completely enclosed by the exterior film covering a layer of adhesive is coated on at least a portion of an outer surface of the exterior film covering.

The exterior film covering is described herein as having two surfaces, an inner surface which is in contact with the vibration attenuating surface and an outer surface which is its surface which is not in contact with the vibration attenuating material.

The present invention also provides a method of attenuating vibration in a structure comprising the step of positioning an attenuating article in relation to the structure such that the attenuating article is capable of attenuating the vibration of the structure in at least one vibrational mode, wherein the attenuating article comprises:

(a) a vibration attenuating material, wherein the vibration attenuating material has a storage modulus greater than about $6.9\times10^3$ Pascals and a loss factor greater than about 0.01 at 25° C. and 1 Hertz, wherein the vibration attenuating material has a surface and an interior;

(b) an exterior film covering, wherein the exterior film covering film has a tensile modulus greater than about $6.9\times10^3$ Pascals at 25° C. and 50% relative humidity, wherein the exterior film covering comprises one or more of the following:
  (i) a film,
  (ii) a film segment;

wherein the vibration attenuating material surface is at least partially enclosed by the exterior film covering;

wherein an inner surface of the exterior film covering conforms to the surface of the vibration attenuating material that it is at least partially enclosing; wherein at least a portion of the surface of the enclosed vibration attenuating material has a three dimensional shape;

(c) optionally one or more interior film dividers, wherein each interior film divider has a tensile modulus greater than about $6.9\times10^3$ Pascals at 25° C. and 50% relative humidity, wherein each interior film divider comprises one or more of the following:
  (i) a film;
  (ii) a film segment;

wherein each interior film divider separates at least a portion of the vibration damping material from another portion of the vibration damping material; and (d) optionally a layer of adhesive coated on one or more of the following:
  (i) at least a portion of a surface of the exterior film covering;
  (ii) at least a portion of a surface of any interior film divider, if present;
  (iii) at least a portion of any vibration attenuating material which is not enclosed by the exterior film covering.

A preferred method is that wherein the vibration amplitude of the structure has been reduced by at least about 10% in one mode.

The exterior film covering is described herein as having two surfaces, the inner surface which is in contact with the vibration attenuating surface and the outer surface, which is its surface which is not in contact with the vibration attenuating material.

Preferably the structure in the above listed method is selected from the group consisting of disk drive assemblies, optical disk drives, compact disk assemblies, appliances, transport vehicles, automobiles, doors, drawers, hoods, computers, test equipment which is sensitive to shock or vibrations, and the like.

As a specific example, an article of the invention, when used to damp a disk drive, may be placed between the top magnet plate of the actuator voice coil motor assembly and the disk drive top cover. The vibration attenuator is typically placed under 1–40 percent compression when the cover is attached to the base of the drive. The damper could also be placed, for example, between the bottom magnet plate and the base of the disk drive. This damper location may not have significant compression, but the damper does contact the base of the drive and the bottom magnet plate. U.S. Pat. No. 5,224,000, incorporated by reference herein, provides additional detail regarding disk drives.

As another example, an article of the invention when used to isolate a disk drive actuator may be placed between an edge surface of the voice coil motor, typically on the coil of the voice coil motor or the side edge of the "E-block" assembly used to support the read/write elements, or on a surface opposite the coil or "E-Block" assembly, when the voice coil motor is actuated or is subjected to excessive vibrations or shocks allowing the actuator to impinge against a surface with the article, the article of the invention attenuates the vibration or shock.

As another example, an article of the invention can be used to isolate a door or drawer when the structure is opened or closed, (i.e. actuated in the door or drawer frame thus producing a vibration or shock). The article may be placed on the door or drawer at a location that will contact the structure the door or drawer is being impinged against. The article of the invention will attenuate the vibration or shock energy and reduce the acoustical noise and vibration level.

The present invention also provides a structure having an attenuating article positioned in relation to the structure such that the attenuating article is capable of attenuating the vibration of the structure in at least one vibrational mode, wherein the article comprises:

(a) a vibration attenuating material, wherein the vibration attenuating material has a storage modulus greater than about $6.9 \times 10^3$ Pascals and a loss factor greater than about 0.01 at 25° C. and 1 Hertz, wherein the vibration attenuating material has a surface and an interior;

(b) an exterior film covering, wherein the exterior film covering film has a tensile modulus greater than about $6.9 \times 10^3$ Pascals at 25° C. and 50% relative humidity, wherein the exterior film covering comprises one or more of the following:
  (i) a film;
  (ii) a film segment;
wherein the vibration attenuating material surface is at least partially enclosed by the exterior film covering;
wherein an inner surface of the exterior film covering substantially conforms to the surface of the vibration attenuating material that it is at least partially enclosing; wherein at least a portion of the surface of the enclosed vibration attenuating material has a three dimensional shape;

(c) optionally one or more interior film dividers, wherein each interior film divider has a tensile modulus greater than about $6.9 \times 10^3$ Pascals at 25° C. and 50% relative humidity, wherein each interior film divider comprises one or more of the following:
  (i) a film;
  (ii) a film segment;
wherein each interior film divider separates at least a portion of the vibration damping material from another portion of the vibration damping material;

(d) optionally a layer of adhesive coated on one or more of the following:
  (i) at least a portion of a surface of the exterior film covering;
  (ii) at least a portion of a surface of any interior film divider, if present;
  (iii) at least a portion of any vibration attenuating material which is not enclosed by the exterior film covering.

Definitions

The term "attenuator" as used herein includes dampers, isolators, and combinations thereof that dissipate vibration energy and/or shock and/or change the vibration and/or shock transmitted to a structure that it is used with, in or on.

The term "attenuating material" as used herein refers to a material that provides vibration and/or shock energy dissipation and/or shock and/or vibration isolation improvement.

The novel articles of the present invention overcome the many shortfalls of current damper designs by having the following design and application advantages:

1) An optimum vibration attenuating material can be used for a given application, without the Tg, and thus the potential tackiness of the material necessarily being a limiting factor to the design or use of the novel article. The novel article design provides for partial or complete enclosure of the attenuating material to limit negative effects of using a preferred vibration attenuating material.

2) The novel articles can be designed such that they will not experience negative "blooming" effects as some current dampers do. The exterior film covering may cover the vibration attenuating material completely or to a large extent and prevent the vibration attenuating material from blossoming around the exterior film covering and creating contact with an undesired surface.

3) The novel articles of the invention do not require a film extending away from the attenuating material surface to prevent blooming around the film edges as some existing dampers use. The current dampers that use a film extending away from the damping material surface are expensive to manufacture, difficult to handle, and complex to manufacture.

4) The novel articles of the invention are a unitary design. Single piece construction reduces application costs as compared to the current two-part damper used in many disk drives.

5) The novel article of the invention allows tacky vibration attenuating materials having low Tgs and/or low crosslinking levels to be used. The novel article can eliminate the problems associated with using the optimum tacky vibration attenuating materials for a damper. Previously, some dampers have overcome some of the current damping material problems (for example the tacky characteristic of the damping material at application or drive operating temperature), but in doing so they created new problems by using high modulus (high Tg, high cross-linking) damping materials which have minimal stress relaxation and thus retain a significant amount of stress when compressed. As many applications require stress relaxation, for example, to prevent the disk drive cover from being bowed during or after the dampers application, the high Tg damper is not acceptable for many applications. Plus, the damping performance of the damper is less than optimum.

6) The novel articles of the invention can potentially use an optimum vibration attenuating material which may be, for example, a tacky material and minimize collection of contamination, as a significant portion of the surface of the article may not be tacky depending on the size of the exterior film covering. In addition, the novel article may, depending on its design, be effectively cleaned by hand or in automatic cleaning systems. The current generation vibration attenuating materials are not easily cleaned and collect contamination (dust, debris, etc.) easily as a tacky surface is often related to the damping material. As a damper may need to be clean to a level sufficient to meet a clean room designation of Class 1 or Class 100, the novel article of the invention is particularly advantageous.

7) The novel articles of the present invention can use films that act as barriers to components outgassing from the vibration attenuating material (examples include unreacted monomers, impurities, small molecular weight reaction components such as alcohols, catalysts such as those based on tin or platinum, etc.). The outgassing components may have a reduced surface area from which to escape as compared to conventional dampers wherein the vibration attenuating material is not enclosed as in the article of the present invention. The exposed areas of the vibration attenuating material can also be significantly less than for the vibration attenuating material of a current damper.

If pre-outgassing should be needed for the novel articles of the invention this also can be accomplished, but with the added benefit that the vibration attenuating material is generally not exposed and thus will not collect debris if outgassed on a convection type air heated oven. The novel article design is also less likely to absorb undesirable components that the articles may be exposed to during cleaning, shipping, handling and manufacture and that could outgas at a later time.

8) The article of the invention is easily positioned by hand or by the use of a mechanical device such as tweezers, graspers, etc., with little or no limitation based on the type of vibration attenuating material used in the article. Automated devices may also be used to position the article of the invention. Current dampers can be difficult to handle and efforts to automate their placement would require special methods to handle a tacky attenuating material.

9) The novel articles of the invention can have a plethora of shapes and provide greater ranges for dimensions and aspect ratios than known dampers. The novel articles may optionally have one or more of the following features: holes, multiple contours, ridges, raised portions, flat surfaces, protrusions, convex features, concave features, and flaps of film at the article's edges. These features allow the article to be custom shaped for specific applications and can allow the article to have less conventional shapes to aid in locating the part for assembly or inspection.

10) The articles of the invention can have up to 100% of the vibration attenuating material surface covered by the exterior film covering, thus improving the oxidative resistance of the vibration attenuating material at elevated temperature for short times or at medium temperatures at long time. The vibration attenuating material may be substantially or completely protected from oxidative deterioration (depending on the size and characteristics of the exterior film covering, etc.), and thus is more likely to retain its vibration attenuating properties.

Oxidation is detrimental in that it can change the properties of the vibration attenuating material of the article and decrease its benefits. The use of the exterior film covering can also allow the use of a vibration attenuating material which is substantially free of oxidation inhibitors (antioxidants, for example). The elimination or reduction of antioxidants and other chemicals to enhance the thermal oxidative stability of the vibration attenuating material used in the novel article of the invention can allow for the use of a less costly damping material, a material which experiences less outgassing, as well as a material which has a higher polymerization degree and which can be prepared via a faster reaction compared to those materials which contain oxidation inhibitors.

Further, the novel articles of the invention may utilize films of multiple layers. The multiple layers can improve the barrier properties of the film(s) layer. They can also provide good conformability to the vibration attenuating material and also reduce the stiffness of single layer film. For example, a film 6 mils (0.15 mm) thick may be stiffer than a tri-layer film of three layers each 2 mils (0.051 mm) thick, each layer separated by an adhesive layer or otherwise bonded to each other with a lower modulus material. Multiple layers bonded together via a vibration attenuating material may also improve the vibration attenuating ability of the article as compared to a single film layer.

The use of an exterior film covering which may cover a large portion or all of the vibration attenuating material may also lead to increased shearing of the vibration attenuating material in shearing and compression-tension modes. Thus improved damping may be achieved by the use of the novel article over the conventional damper.

Protrusions extending from the exterior film covering into the vibration attenuating material can also improve the shearing effect in the vibration attenuating material and further increase vibration attenuation. A portion of the resulting mechanical strain energy in the vibration attenuating material is then dissipated in the form of heat. The higher the strain energy into the vibration attenuating material, the more vibration energy is dissipated from the system in which the article is used.

11) The novel article of the invention may have increased environmental survivability with the use of various wear/abrasion, chemically, thermally and radiation (for example, ultraviolet or infrared radiation) resistant films and/or film segments. The novel articles of the invention may have improved resistance to harsh environments such as gases or solutions they may come into contact with during manufacture or use. These harsh mediums can react with exposed vibration attenuating material to reduce the benefit of the article. In addition, reactions between the vibration attenuating material and the harsh environment can create secondary components that may have a negative effect on other materials near the article's use location.

Furthermore, components or agents used in the vibration attenuating material manufacture may escape from the article and have negative effects on materials near the article's use location. For example, if the vibration attenuating material uses a catalyst that can be leached from the vibration attenuating material, it can cause detrimental reactions to occur elsewhere in the area near the article's use location.

12) The novel article of the invention can be designed to have a high degree of wear or abrasion resistance. This improved wear and abrasion resistance expands the article's use to applications where the current generation dampers are not utilized because of concerns regarding abrasion or wear. Wear or abrasion could be induced by contact of the article to other objects or exposure to a flow of material (fluids such as air, water, slurries, etc.).

BRIEF DESCRIPTION OF THE DRAWINGS

FIG. 1 illustrates a partially exploded view of a disk drive showing a location where a damper could be used.

FIGS. 2–2d illustrate cross-sectional views of prior art dampers.

FIGS. 6a–6c illustrate cross-sectional view of embodiments of the articles of the invention.

FIGS. 7a–7c illustrate cross-sectional view of embodiments of the articles of the invention.

DETAILED DESCRIPTION OF THE INVENTION

ARTICLE SHAPES

Figure 3A:
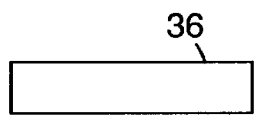
FIGS. 3a–3l illustrate top plan views of embodiments of the articles of the invention.
Figure 3B:
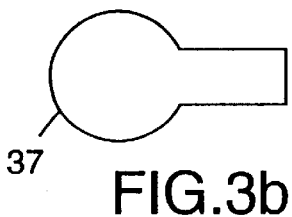
Figure 3I:
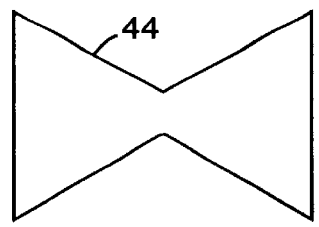
Figure 3C:
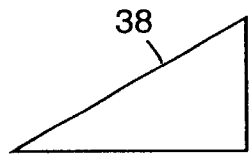
Figure 3D:
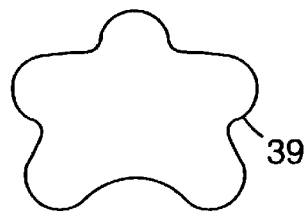
Figure 3J:
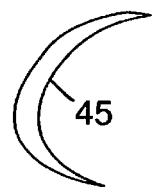
Figure 3E:
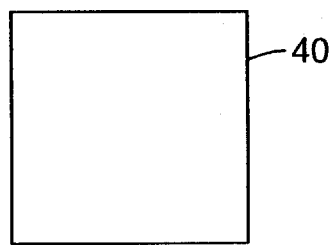
Figure 3F:
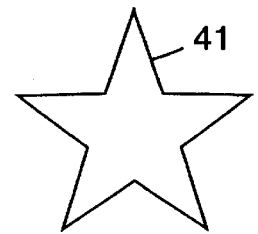
Figure 3K:
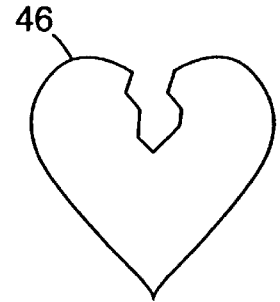
Figure 3G:
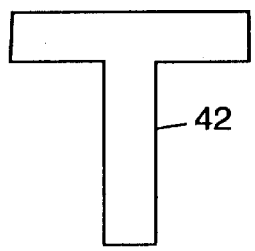

The article of the invention, as well as the vibration attenuating material, may have a variety of shapes. The shapes may or may not be symmetrical. Examples of suitable shapes include but are not limited to those selected from the group consisting of polyhedrons such as cubes, rings, pyramids, prisms, truncated pyramids, stepped pyramids, stepped rectangles, etc., and other shapes such as cylinders, cones, spheres, hemispheres, pillows, etc.

The article may optionally have at least one flat surface which may be used to mount the article for its intended application. This surface typically has an adhesive (most typically a pressure sensitive adhesive) coated thereon to aid in mounting the article. The adhesive may be coated onto any exposed vibration attenuating material and/or the outside surface of the exterior film covering that encloses the vibration attenuating material. The exposed vibration attenuating material may possess adhesive characteristics itself and thus could aid in adhering the article to a surface if desired.

EXTERIOR FILM COVERINGS AND INTERIOR FILM DIVIDERS

The exterior film covering comprises one or more films and/or film segments of various properties. Likewise, the interior film dividers may comprise one or more films and/or film segments of various properties. These films and/or film segments may have the same or different chemical compositions, dimensions (thickness, widths, lengths) etc. These films and/or film segments may adjoin, overlay, overlap each other, etc. These film(s) and/or film segment(s) may be continuous or discontinuous, with or without perforations, holes, and/or slits, etc. Likewise the exterior film covering and the interior film dividers may be continuous or discontinuous, with or without perforations, holes, and/or slits, etc. The exterior film covering and the interior film dividers, as well as each film and/or film segment which make them up, may optionally have various degrees of surface roughness in order to modify the article's performance.

Various films and/or film segments may be used in the exterior film coverings and internal film dividers. The films and/or film segments may be woven and/or nonwoven. For example, the non-woven could be a hot melt blown microfiber of polypropylene and/or polyester. The films and/or film segments may optionally be porous. Polymeric and/or non-polymeric films and/or film segments may be used. Examples of suitable polymeric films include but are not limited to those selected from the group consisting of polyester, polyimide, polyamide, polyethylene, polypropylene, acrylic, phenolic, polyvinyl chloride, polyurethane, polystyrene, fluorinated polymer films (such as those available under the trademark Teflon from DuPont), polyvinyl acetates, nylon, etc. Useful non-polymeric films and/or film segments include but are not limited to those selected from the group consisting of aluminum, gold, silver, stainless steel, copper, brass, etc. Amorphous polyester is a preferred film.

The films and/or film segments may optionally be metalized, corona treated, pigmented, provided with a release surface, provided with a surface capable of dissipating static electricity, provided with a reflective surface, provided with an adhesive surface, provided with environmental resistance (i.e. resistance to heat, humidity, chemicals, radiation, and/or vacuum effects, etc.), provided with wear or abrasion resistance, provided with compatibility (environmentally, mechanically, and/or chemically) with a planned surface that it will contact, provided with a low energy surfaces, provided with gaseous and/or liquid barrier properties, and/or provided with thermal and/or electrical conductivity in order to provide an exterior film covering and/or internal film divider having such properties. The films and film segments may be coated with various coatings such as epoxies, waxes, silicones, fluoropolymers to impart release characteristics or low energy surfaces to the exterior film covering and/or the interior film divider. The films and/or film segments may optionally be impregnated with various materials to modify their properties (such as fillers, toughening agents, colorants, fibers, particulate, etc.) The film and/or film segment properties may be localized to specific areas if desired.

Different films and/or film segments may be used to provide an exterior film covering or an internal film divider with different properties. For example, the exterior film covering may comprise two layers which can be identified as an inner film and an outer film. An inner film may be selected to which the vibration attenuating material readily adheres while the outer film of the exterior film covering may be selected which provides better exterior wear characteristics to the damper (such as scuff resistance). Other exterior film coverings are possible. The exterior film covering may comprise one, two, three, four, five, or more layers of film and/or film segments. Likewise each interior film may comprise one, two, three, four, five, or more layers of film and/or film segments. As another example, the exterior film covering may have inner and outer layers which are the same, but a middle layer which is different. If the exterior film covering comprises more than one film or film segment the films and film segments may optionally be bonded together via an adhesive such as a pressure sensitive adhesive or otherwise optionally bonded together by other means. The same potential for bonding also applies to the interior film dividers.

Other examples include a three layer exterior film covering construction comprising a low density/high density/low density polyethylene construction, a low density/medium density/high density polyethylene construction, and a low density polyethylene/high density polyethylene/low density polyethylene. One or more of the aforementioned film layers may optionally be thermally or electrically conductive. The exterior film covering may also comprise, for example, constructions of polyester/polyimide or acrylic/polyester or polyethylene/polyamide, etc.

The article of the invention may optionally have one or more impressions therein in order to aid application, assembly or identification of the articles for manufacturer, end-user, application, etc. The impressions can be made in one or more of the following: the exterior film covering, the vibration attenuating material, the interior film divider(s). An example would be an identification logo to identify the end user.

As mentioned previously the vibration attenuating material may be partially or completely enclosed by the exterior film covering. When the vibration attenuating material is partially enclosed by the exterior film covering typically about 50 to about 99 percent of the surface of the vibration attenuating material is enclosed by the exterior film covering, more typically about 60 to about 90 percent, and most typically about 65 to about 85 percent.

The exterior film covering may optionally have features such as protrusions, impressions, etc. These features may be on the side of the exterior film covering contacting the vibration attenuating material or on the side of the exterior film covering not contacting the vibration attenuating material, or both. These features may impart various potential performance characteristics to the article or aid in its intended end use. The protrusions can also improve the bonding or adherence of the film to the attenuating material.

Likewise the interior film dividers may have such features on either or both sides thereof.

The exterior film covering encloses the vibration attenuating material. A surface of the exterior film covering that contacts the vibration attenuating material is considered to be an inner surface, whereas a surface of the exterior film covering which does not contact the vibration attenuating material is considered to be an outer surface. Some designs allow for one film to function as an exterior film covering for a sections(s) of the article where it encloses vibration attenuating material by only one of its sides but as an interior film divider where it is contacted on both of its sides by vibration attenuating material. This concept is further explained in the discussion of the Figures.

Optionally two or more of the articles of the invention can be joined together by or through their exterior film coverings. (for example one continuous film may serve as part of the exterior film covering of two or more articles). Optionally two or more of the articles of the invention may be adhered together either via an adhesive or via exposed vibration attenuating material.

The adhesive layer can comprise one or more layers of adhesive which may be the same or different. The adhesive layer may for example, be fully cured or partially cured. Examples of suitable adhesives include but are not limited to those selected from the group consisting of pressure sensitive adhesives, epoxies, structural epoxies, and the like. The adhesive layer may be continuous or discontinuous.

VIBRATION ATTENUATING MATERIALS

The term "vibration attenuating material" as used herein includes vibration damping materials, vibration isolating materials, combinations thereof, etc.

The vibration and/or shock attenuating material can include any material that is viscoelastic. A viscoelastic material is one that is viscous, and therefore capable of dissipating energy, yet exhibits certain elastic properties, and therefore capable of storing energy. That is, a viscoelastic material is an elastomeric material typically containing long-chain molecules that can convert mechanical energy into heat when they are deformed. The viscoelastic material can also be designed to have the desired elastic characteristics needed to provide isolation properties and a lower level of damping than as used in a design where damping is a primary design objective. Such a material typically can be deformed, e.g., stretched, by an applied load and gradually regain its original shape, e.g., contract, sometime after the load has been removed.

Additives such as flame retardants, antioxidants, fibers, anti-static additives, particulate and colorants can also be added to the attenuating material to impart specific performance features.

The viscoelastic attenuating material useful in the invention can be a thermoplastic polymer or a thermoset polymer or combination of both fully or partially cured. Thermoset polymers, while useful as viscoelastic attenuating materials, are used less often than thermoplastic polymers due to their lower effective temperature range of high damping. Preferably, the viscoelastic attenuating material is a thermoplastic polymer, such as an acrylate.

Suitable viscoelastic materials for use in the vibration attenuating materials of the present invention have a storage modulus, i.e., measure of the energy stored during deformation, of at least about 1 psi ($6.9 \times 10^3$ Pascals). The storage modulus of useful viscoelastic materials can be as high as 500,000 psi ($3.45 \times 10^9$ Pascals); however, typically it is about 1–2000 psi ($6.9 \times 10^3$–$1.4 \times 10^7$ Pascals).

Suitable viscoelastic materials for use in the vibration attenuating materials of the present invention that have as a primary design goal damping, have a loss factor, i.e., the ratio of energy loss to energy stored, of at least about 0.01. Preferably the loss factor is at least about 0.1, more preferably about 0.5–10, and most preferably about 1–10, regardless of the frequency and temperature experienced by the material. Suitable viscoelastic material for use in vibration attenuation materials of the present invention that have as a primary design goal isolation, have a loss factor of less than 1.0, preferably less than 0.3–0.5 and most preferably less than about 0.1. An attenuator design material should be selected that allows the isolation level required to be achieved, along with the minimum damping needed to allow control of the desired resonant frequencies (if the material is available).

This loss factor represents a measure of the energy dissipation of the material and depends on the frequency and temperature experienced by the attenuating material. For example, for a lightly crosslinked acrylic polymer with a Tg of about 5° C., at a frequency of 1 Hz and a primary design goal of damping, the loss factor at 68° F. (20° C.) and 1 Hz is about 1.0, while at 158° F. (70° C.) the loss factor is about 0.7. As the Tg of a material is also an indicator of the potential for the damping material to have a tacky or sticky characteristic, especially if the attenuating material is only lightly crosslinked, the aforementioned acrylic damping material is very tacky at 25° C.

Attenuating materials that have high Tgs (Tg>60° C. at a frequency of 1 Hz) are known. However, these higher Tg materials may have less capacity to add damping to the system at the use temperature (for example, the typical drive operating temperature range of 5° C. to 65° C.). Thus, attenuating polymers with a Tg greater than 60° C. may have limited benefit for most disk drive applications. Thus, the optimum attenuator for a drive actuator application uses an attenuating material with a Tg less than about 60° C. (at a typical drive operating temperature of 5 to 65° C.) and most preferably an attenuating material with a Tg less than about 45° C. at a frequency of 1 Hz, and most preferably an attenuating material with a Tg less than about 38° C. at a frequency of 1 Hz. This damper will tend to be tacky and build a strong bond to most surfaces it comes into contact with (stainless steel, aluminum, epoxy coatings, etc.)

The material selected for use in an isolator design that has vibration or shock isolation as the primary design objective, will typically have less damping (lower loss factor) than material for a design where vibration damping is the primary design objective. This is because an undamped material is superior to a damped material in reducing transmissibility. However, reduction in transmissibility occurs only for frequencies greater than the square root of 2 times the natural frequency of the isolator, v. Therefore, the material must have an amount of damping sufficient to reduce structural resonant amplitudes for resonances occurring below v to an acceptable level.

Preferred viscoelastic materials are those that remain functional over a wide range of temperatures, e.g., −60° F. (−51° C.) to 600° F. (315° C.). Most preferred viscoelastic materials are those that cover the broadest temperature and frequency range at the desired loss factor and storage modulus to achieve acceptable attenuation of the item that the attenuator of the invention is being used to damp, isolate, or both and do not experience a significant degradation in properties due to long times at high temperatures or short excursions beyond these high temperature levels.

Useful viscoelastic attenuating materials can be isotropic as well as anisotropic materials, particularly with respect to its elastic properties. As used herein, an "anisotropic material" or "nonisotropic material" is one in which the properties are dependent upon the direction of measurement. Suitable viscoelastic materials include urethane rubbers, silicone rubbers, nitrile rubbers, butyl rubbers, acrylic rubbers, natural rubbers, styrene-butadiene rubbers, and the like. Other useful attenuating viscoelastic materials include polyesters, polyurethanes, polyamides, ethylene-vinyl acetate copolymers, polyvinyl butyral, polyvinyl butyral-polyvinyl acetate copolymers, epoxy-acrylate interpenetrating networks and the like.

Examples of thermoplastic materials suitable for use as the vibration attenuating material in attenuators of the present invention include, but are not limited to, those selected from the group consisting of polyacrylates, polycarbonates, polyetherimides, polyesters, polysulfones, polystyrenes, acrylonitrile-butadiene-styrene block copolymers, polypropylenes, acetal polymers, polyamides, polyvinyl chlorides, polyethylenes, polyurethanes, and combinations thereof.

Useful viscoelastic materials can also be crosslinkable to enhance their strength. Such viscoelastics are classified as thermosetting resins. When the viscoelastic material is a thermosetting resin, then prior to the manufacture of the attenuators of the invention the thermosetting resin is in a thermoplastic or uncured state. During the manufacturing process, the thermosetting resin is cured or crosslinked typically to a solid state, although it could be a gel upon curing as long as the cured material possesses the viscoelastic properties described above. Depending upon the particular thermosetting resin employed, the thermosetting resin can include a curing agent, e.g., catalyst, which when exposed to an appropriate energy source (such as thermal energy) the curing agent initiates the polymerization of the thermosetting resin. Particularly preferred viscoelastic attenuating materials are those based on acrylates.

In general, any suitable vibration attenuating material can be used. The choice of vibration attenuating material for a particular set of conditions, e.g., temperature, frequency of vibration or shock, balance of damping and/or isolation is determined by a particular application. The selection of a suitable vibration attenuating material is also based on the processability of the material. It is to be understood that blends of any of the foregoing materials can also be used.

The attenuating properties of the vibration attenuating article may be enhanced by the inclusion of an effective amount of a fibrous or particulate material in the attenuating material of the attenuating article. Herein, an "effective amount" of a fibrous material or particulate is an amount sufficient to impart at least improvement in desirable characteristics to the attenuation material. Generally, the fibrous or particulate material is used in an amount effective to increase the strain energy ratio of a component containing the same amount and type of attenuation material without the fibrous or particulate material. Generally, an increase in the strain energy ratio of a factor of at least about two in at least one vibrational mode is desired. Typically, the amount of the fibrous material in the viscoelastic material is within a range of about 360 wt %, preferably about 10–50 wt %, more preferably about 15–45 wt %, and most preferably about 30–35 wt %, based on the total weight of the vibration attenuating material. Typically, the amount of the particulate material in the attenuating material is within a range of about 0.5–20 wt %, preferably about 1–15 wt %, more preferably about 5–15 wt %, and most preferably about 5–10 wt %, based on the total weight of the vibration attenuating material.

The fibrous material can be in the form of fibrous strands or in the form of a fiber mat or web, although fibrous strands are preferred. The fibrous strands can be in the form of threads, cords, yarns, rovings, filaments, etc. They can be dispersed randomly or uniformly in a specified order. Preferably, the fibrous strands, i.e., fibers or fine threadlike pieces, have an aspect ratio of at least about 2:1, and more preferably an aspect ratio within a range of about 2:1 to about 10:1. The aspect ratio of a fiber is the ratio of the longer dimension of the fiber to the shorter dimension.

The fibrous material can be composed of any material that increases the attenuation capability of the cured attenuating material. Examples of useful fibrous materials in applications of the present invention include metallic fibrous materials, such as aluminum oxide, magnesium, or steel fibers, as well as nonmetallic fibrous materials, such as fiberglass. Generally, high Young's modulus fibrous materials, i.e., those having a modulus of at least about 1,000,000 psi ($6.9 \times 10^9$ Pascals), are preferred. Most preferably, the fibrous material is nonmetallic. The nonmetallic fibrous materials can be a variety of materials, including, but not limited to, those selected from the group consisting of glass, carbon, minerals, synthetic or natural heat resistant organic materials, and ceramic materials. Preferred fibrous materials are organic materials, glass, and ceramic fibrous material.

By "heat resistant" organic fibrous material, it is meant that useable organic materials should be sufficiently resistant to melting, or otherwise softening or breaking down, under the conditions of manufacture and use of the attenuators of the present invention. Useful natural organic fibrous materials include, but are not limited to, those selected from the group consisting of wool, silk, cotton, and cellulose. Examples of useful synthetic organic fibrous materials include, but are not limited to, those selected from the group consisting of polyvinyl alcohol, nylon, polypropylene, polyester, rayon, polyamide, acrylic, polyolefin, aramid, and phenol. The preferred organic fibrous material for applications of the present invention is aramid fibrous material. Such a material is commercially available from DuPont Co., Wilmington, Del. under the trade names of "Kevlar" and "Nomex."

Generally, any ceramic fibrous material is useful in applications of the present invention. An example of a ceramic fibrous material suitable for the present invention is NEXTEL™ which is commercially available from Minnesota Mining and Manufacturing Co., St. Paul, Minn. Examples of useful, commercially available, glass fibrous material are those available from PPG Industries, Inc. Pittsburgh, Pa., under the product name E-glass bobbin yarn; Owens Corning, Toledo, Ohio, under the product name "Fiberglass" continuous filament yarn; and Manville Corporation, Toledo, Ohio, under the product name "Star Rov 502" fiberglass roving.

Advantages can be obtained through use of fibrous materials of a length as short as about 100 micrometers. The fibers are not limited in length but much longer fibers may provide insufficient fiber interface and therefore decreased shearing surfaces between fibers. The fiber thickness or diameter for typical fibrous material ranges from about at least 5 micrometers. The thinner the fiber, the higher the surface area of the fibrous material. Thus, preferred fibrous materials are very thin. The thickness of the fiber is also dependent upon the desired thickness of the overall damper of the invention. Thus, many common fibers may be suitable.

The particulate material useful in the invention can be in the form of glass and ceramic bubbles or beads, flakes, or powder, as long as the viscoelastic can wet the surface of the material. The particulate material can vary in size and be a random distribution or a specific distribution of size(s) within the practical limits of the attenuator design. Preferably, the particulate material is on the size order of about 0.1 to about 5 micrometers and more preferably about 0.1 to about 2 micrometers. The particulate material can be composed of any material that increases the attenuating capability of the attenuating material.

Examples of useful particulate materials in applications of the present invention include coated or uncoated glass and ceramic bubbles or beads such as thermally conductive bubbles, electrically conductive bubbles, powders such as aluminum oxide powder and aluminum nitride powder, silica, cured epoxy nodules, uncured epoxy nodules, and the like, i.e., those having a modulus of at least about 10,000 psi ($6.9 \times 10^7$ Pascals), are preferred. More preferably, useful particulate materials have a Young's modulus of about 100,000 psi ($6.9 \times 10^8$ Pascals), and most preferable are those with a modulus of at least 1,000,000 psi ($6.9 \times 10^9$ Pascals).

In addition to fibers and particulate material, the vibration attenuating material of the present invention can optionally include additives such as fillers (e.g. talc, clay, etc.), colorants, toughening agents, fire retardants, antistatic agents, antioxidants, and the like. Sufficient amounts of each of these materials can be used to effect the desired result.

This invention will be better understood by referring to the following figures which are not meant to be limiting.

Figure 3H:
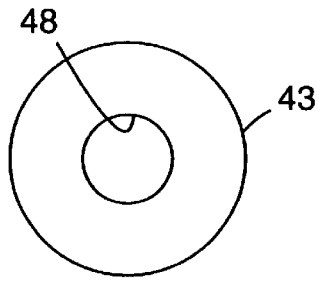
Figure 3L:
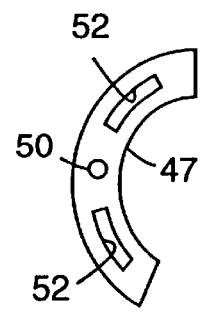

FIGS. 3a–3l illustrate various top plan views of the article of the invention. FIGS. 3a–3l shows dampers having rectangular, key-hole, non-angular symmetric, triangular, square, star, T-shaped, circular with a central hole, symmetrical angular, crescent, irregular, and crescent with one circular and two rectangular cut out shapes, respectively. In FIGS. 3a–3l the exterior film coverings are represented as 36 to 47, respectively. In FIG. 3h the circular hole is represented as 48. In FIG. 3l the circular hole cut out is represented as 50 and the rectangular cut outs are represented as 52.

Figure 4A:
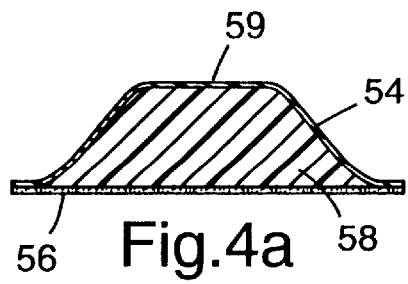
FIGS. 4a–4m illustrate cross-sectional view of embodiments of the articles of the invention.

FIG. 4a illustrates a cross-sectional view of an article of the invention comprising exterior film covering 54 and vibration attenuating material 58, the article having a central raised portion with a flat surface 59 and an adhesive layer 56.

Figure 4B:
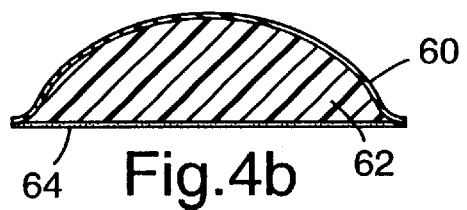

FIG. 4b illustrates a cross-sectional view of the article of the invention comprising exterior film covering 60, vibration attenuating material 62, and pressure sensitive adhesive layer 64.

Figure 4C:
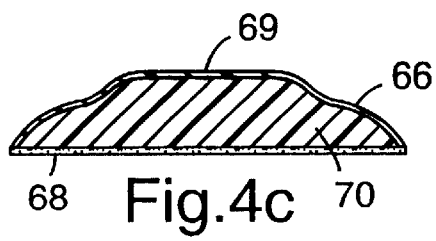

FIG. 4c illustrates a cross-sectional view of an article of the invention comprising exterior film covering 66 and vibration attenuating material 70, the article having a central raised portion with a flat surface 69, and a pressure sensitive adhesive layer 68.

Figure 4D:
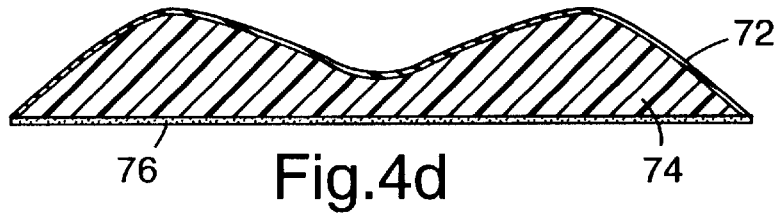

FIG. 4d illustrates a cross-sectional view of the article of the invention comprising exterior film covering 72, vibration attenuating material 74, and pressure sensitive adhesive layer 76.

Figure 4E:
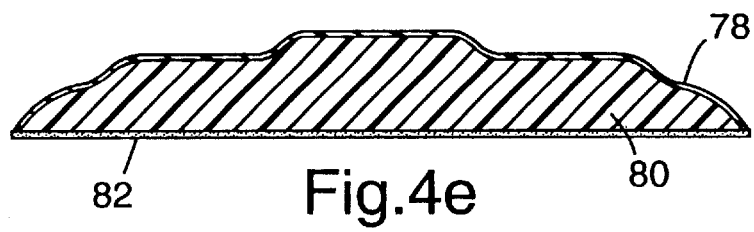

FIG. 4e illustrates a cross-sectional view of the article of the invention comprising exterior film covering 78, vibration attenuating material 80, and pressure sensitive adhesive layer 82.

Figure 4F:
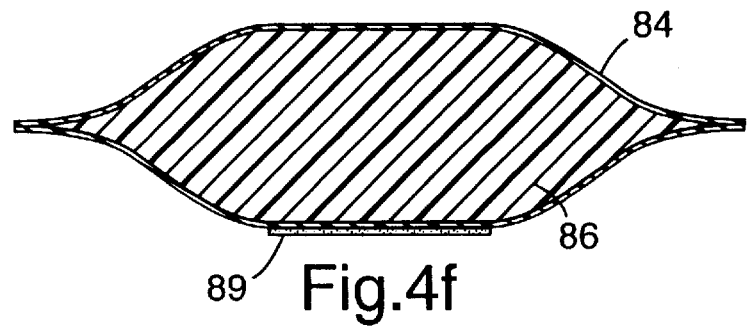

FIG. 4f illustrates a cross-sectional view of the article of the invention comprising exterior film covering 84, vibration attenuating material 86, and pressure sensitive adhesive layer 89.

Figure 4G:
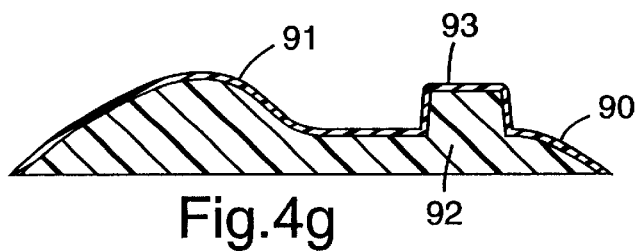

FIG. 4g illustrates a cross-sectional view of the article of the invention comprising exterior film covering 90 and vibration attenuating material 92, the article having a raised curved portion 91 and a raised flat portion 93.

Figure 4H:
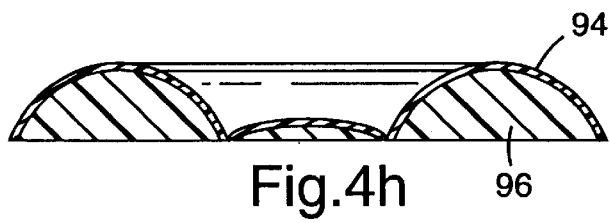

FIG. 4h illustrates a cross-sectional view of an article of the invention comprising exterior film covering 94 and vibration attenuating material 96.

Figure 4I:
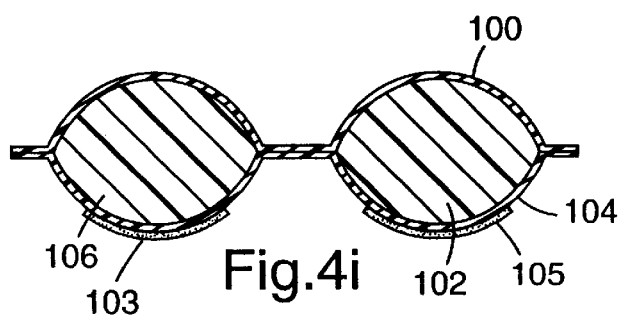

FIG. 4i illustrates a cross-sectional view of an article comprising two articles of the invention joined together by their exterior film coverings 104 and 100. One article contains vibration attenuating material 106 and the other contains vibration attenuating material 102. Adhesive layers 103 and 105 is present on the exterior film covering 104.

Figure 4J:
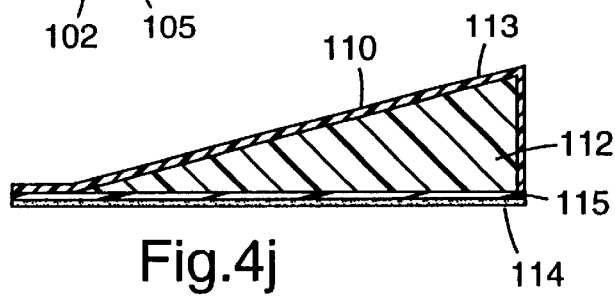

FIG. 4j illustrates a cross-sectional view of an article of the invention comprising exterior film covering 110 (comprising film segments 113 and 115, vibration attenuating material 112, and pressure sensitive adhesive layer 114, wherein the article has a triangular cross-section.

Figure 4K:
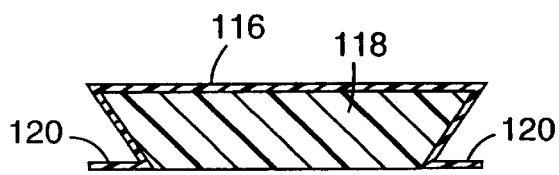

FIG. 4k illustrates a cross-sectional view of the article of the invention comprising exterior film covering 116 and vibration attenuating material 118, wherein the article has a prism shape. The exterior film covering 116 extends away from the vibration attenuating material 118, to form flaps 120.

Figure 4L:
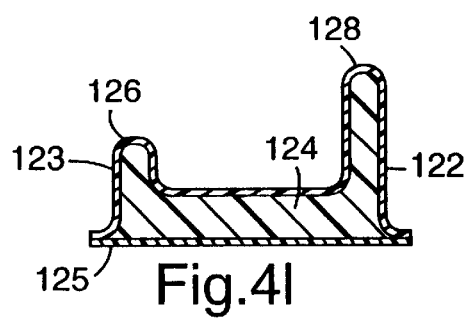

FIG. 4l illustrates a cross-sectional view of the article of the invention comprising exterior film covering 122 (comprising film segments 123 and 125) and vibration attenuating material 124, having two projections (126 and 128) extending from the top surface of the article at either side of the top surface.

Figure 4M:
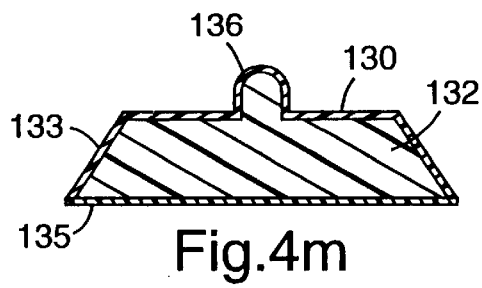

FIG. 4m illustrates a cross-sectional view of an article of the invention comprising exterior film covering 130 (comprising film segments 133 and 135), vibration attenuating material 132., having a central projection 136 extending from the top surface of the article.

Figure 5A:
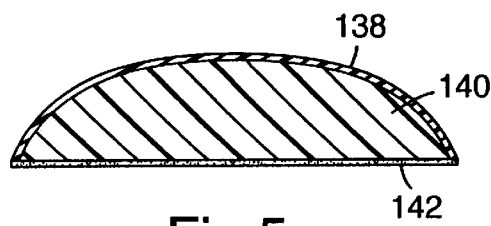
FIGS. 5a–5h illustrate cross-sectional view of embodiments of the articles of the invention.

FIG. 5a illustrates a cross-sectional view of an article of the invention comprising exterior film covering 138, vibration attenuating material 140, and pressure sensitive adhesive layer 142 coated against the exposed surface of vibration attenuating material 140.

Figure 5B:
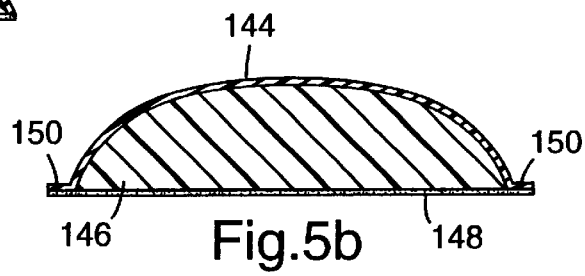

FIG. 5b illustrates a cross-sectional view of the article of the invention comprising exterior film covering 144, vibration attenuating material 146, and pressure sensitive adhesive layer 148. The exterior film covering 144 and pressure sensitive adhesive layer 148 extend to form flaps 150.

Figure 5C:
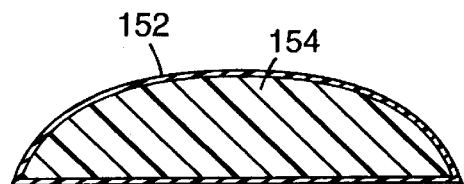

FIG. 5c illustrates a cross-sectional view of an article of the invention comprising exterior film covering 152, vibration attenuating material 154, and pressure sensitive adhesive layer 156.

Figure 5D:
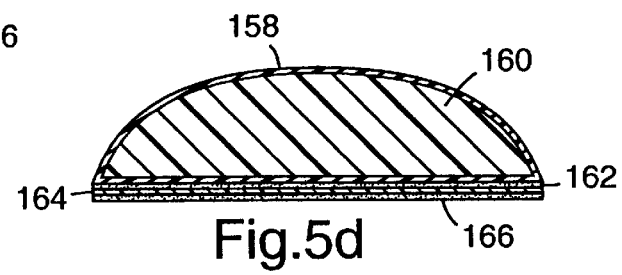

FIG. 5d illustrates a cross-sectional view of the article of the invention comprising exterior film covering 158, vibration attenuating material 160, pressure sensitive adhesive layer 162, film layer 164, and pressure sensitive adhesive layer 166.

Figure 5E:
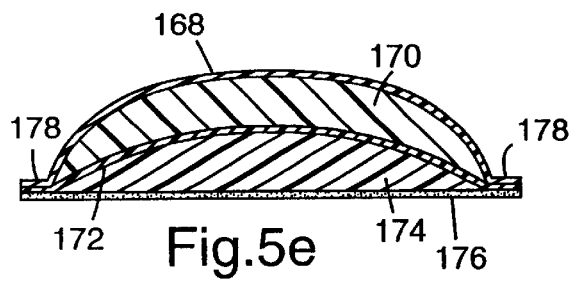

FIG. 5e illustrates a cross-sectional view of an article of the invention comprising exterior film covering 168, vibration attenuating material 170, interior film divider 172, a different vibration attenuating material 174, pressure sensitive adhesive layer 176, and flaps 178.

Figure 5F:
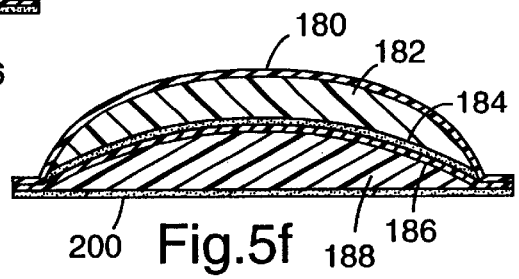

FIG. 5f illustrates a cross-sectional view of the article of the invention comprising two separate attenuators adhered together, the first comprising exterior film covering 180, vibration attenuating material 182, and pressure sensitive adhesive layer 184, and the second comprising vibration attenuating material 188, exterior film covering 186, and pressure sensitive adhesive layer 200.

Figure 5G:
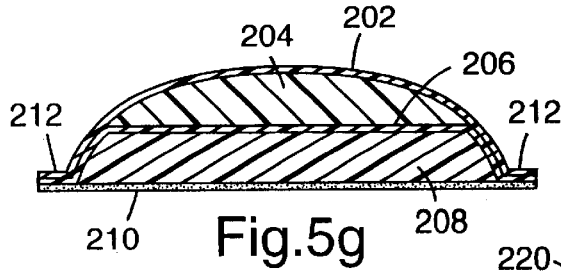

FIG. 5g illustrates a cross-sectional view of the article of the invention comprising exterior film covering 202, vibration attenuating material 204, interior film divider 206, a different vibration attenuating material 208, pressure sensitive adhesive layer 210, and flaps 212.

Figure 5H:
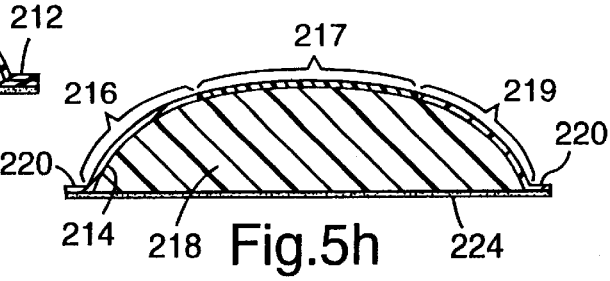

FIG. 5h illustrates a cross-sectional view of the article of the invention comprising exterior film covering 214 (made up of film segments 216, 217, and 219), vibration attenuating material 218, pressure sensitive adhesive layer 224, and flaps 220.

In another embodiment, a cross-sectional view of the article of the invention comprises an exterior film covering, a vibration attenuating material, an adhesive layer (e.g., pressure sensitive adhesive layer, which may be structured with projections), optional flaps, and optional holes. In certain further embodiments, the exterior film covering has holes. In other further embodiments, the exterior film covering comprises a film and film segement, with the exterior film covering being a single layer in some areas and a double layer in others. In another further embodiment, the exterior film covering comprises a film and a film having projections. In yet another further embodiment, the exterior film covering comprises a film segment and a perforated film.

FIG. 6a illustrates a cross-sectional view of the article of the invention comprising exterior film covering 282, vibration attenuating material 286, and pressure sensitive adhesive layer 288. Protrusions 284 extend from the inner surface of the exterior film covering in a direction towards the interior of the article.

FIG. 6b illustrates a cross-sectional view of an article of invention comprising exterior film covering 290, vibration attenuating material 294, pressure sensitive adhesive layer 296, and flaps 298. Protrusions 292 extend from the outer surface of the exterior film covering 290 in a direction away from the interior of the article.

FIG. 6c illustrates a cross-sectional view of an article of the invention comprising exterior film covering 300, vibration attenuating material 304, pressure sensitive adhesive layer 306, and flaps 302.

FIG. 7a illustrates a cross-sectional view of an article of the invention comprising an exterior film covering which is formed from film layers 308, 310, and 312; vibration attenuating material 314, pressure sensitive adhesive layer 316, and flaps 318.

FIG. 7b illustrates a cross-sectional view of the article of the invention comprising exterior film covering 320, vibration attenuating material 322, vibration attenuating material 326 which is different than that of 322, interior film divider 324 having perforations 328, pressure sensitive adhesive layer 330, and flaps 332.

FIG. 7c illustrates a cross-sectional view of an article of the invention comprising vibration attenuating material 334 and another vibration attenuating material 336, a pressure sensitive adhesive layer 338, and flaps 340. An exterior film covering is present which is in some area a single layer and in other areas a double layer. The exterior film covering is a single layer where film 348 contacts vibration attenuating material 334. However, the exterior film covering is a double layer where film layer 348 contacts film segment 344 and also where film layer 348 contacts film segment 346. Film segment 342 which divides vibration attenuating material 334 and 336 is considered to be an interior film divider. Thus, one continuous film having film segments 342, 344, and 346, in some places is considered to be part of the exterior film covering and in others an interior film divider. Film 348 is always considered to be a layer of the exterior film covering.

Figure 8A:
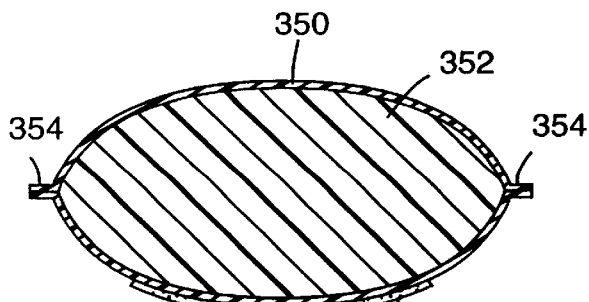
FIGS. 8a–8d illustrate cross-sectional view of embodiments of the articles of the invention.

FIG. 8a illustrates a cross-sectional view of the article of the invention comprising exterior film covering 350, vibration attenuating material 352, flaps 354 and pressure sensitive adhesive layer 353.

Figure 8B:
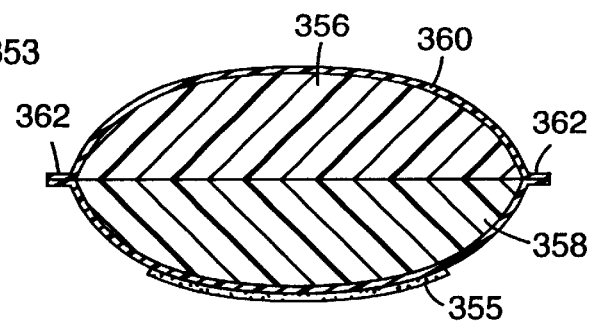

FIG. 8b illustrates a cross-sectional view of the article of the invention comprising exterior film covering 360, vibration attenuating material 356, a chemically different vibration attenuating material 358, flaps 362, and pressure sensitive adhesive layer 355.

Figure 8C:
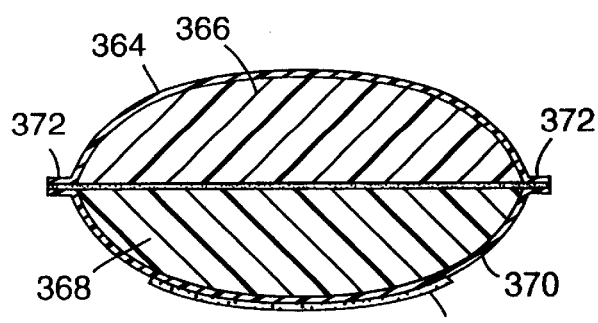

FIG. 8c illustrates a cross-sectional view of two articles of the invention joined by a layer of adhesive. One article comprises exterior film covering 364 and vibration attenuating material 366. The other article comprises exterior film covering 370 and vibration attenuating material 368. The exterior films 364 and 370 are of different chemical compositions. The vibration attenuating materials 366 and 368 are of different chemical compositions. The exterior film cover 370 has an adhesive layer 371 thereon. The flaps are identified as 372.

Figure 8D:
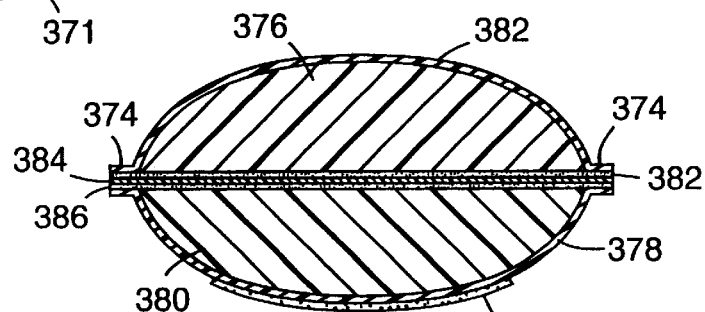

FIG. 8d illustrates a cross-sectional view of two articles of the invention joined together. One article comprises exterior film covering 382 and vibration attenuating material 376. The other article comprises exterior film covering 378 and vibration attenuating material 380. The exterior films 382 and 378 are of different chemical compositions. The vibration attenuating materials 376 and 380 are of different chemical compositions. The articles are joined via a multilayer construction comprising adhesive layers 382 and 386 and inner film layer 384. Exterior film layer 378 has a layer of adhesive 381 thereon. The flaps are identified as 374.

Figure 9A:
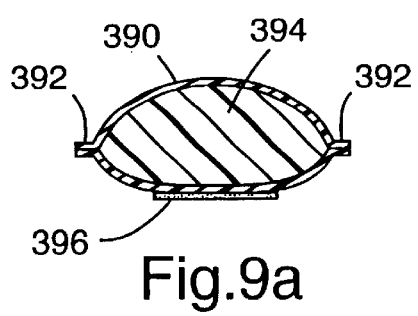
FIGS. 9a–9d illustrate cross-sectional view of embodiments of the articles of the invention.

FIG. 9a illustrates a cross-sectional view of the article of the invention comprising exterior film covering 390, vibration attenuating material 394, flaps 392, and pressure sensitive adhesive layer 396.

Figure 9B:
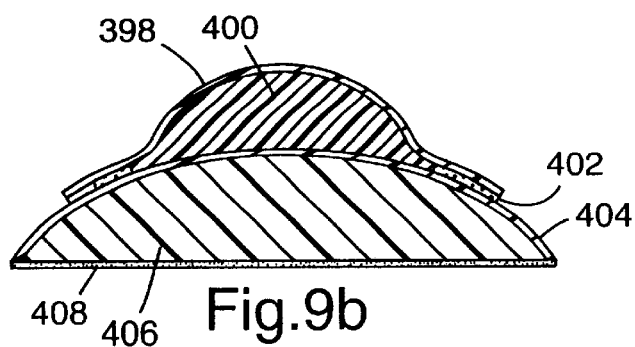

FIG. 9b illustrates a cross-sectional view of two articles of the invention joined together. The first article comprises exterior film covering 398 and vibration attenuating material 400. The second article comprises exterior film covering 404, vibration attenuating material 406, and pressure sensitive adhesive layer 408. The articles are joined via adhesive 402

Figure 9C:
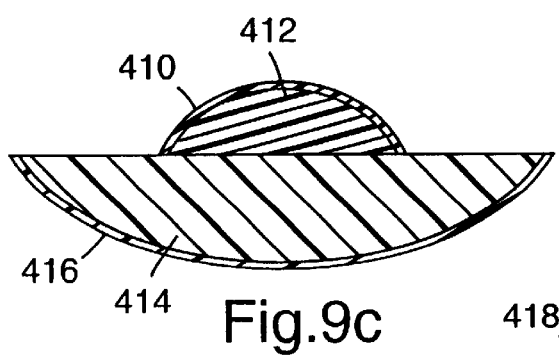

FIG. 9c illustrates a cross-sectional view of two articles of the invention joined together via their vibration attenuating materials. The first article comprises exterior film covering 410 and vibration attenuating material 412. The second article comprises exterior film covering 416 and vibration attenuating material 414.

Figure 9D:
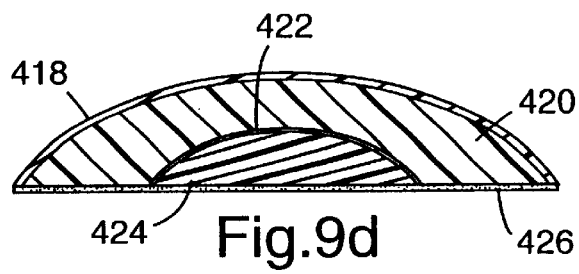

FIG. 9d illustrates a cross-sectional view of the article of the invention comprising an exterior film covering 418, a vibration attenuating material 420, an interior film divider 422, a different vibration attenuating material 424, and a pressure sensitive adhesive layer 426.

Figure 10A:
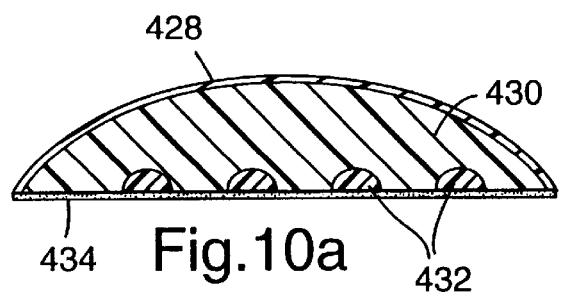
FIGS. 10a–10c illustrate cross-sectional view of embodiments of the articles of the invention.

FIG. 10a illustrates a cross-sectional view of an article of the invention comprising exterior film covering 428, vibration attenuating material 430, and pressure sensitive adhesive layer 434. The vibration attenuating material contains high modulus filler particles 432.

Figure 10B:
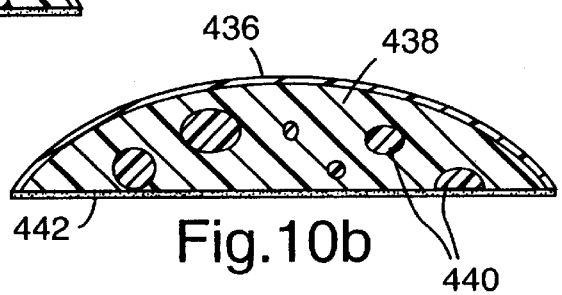

FIG. 10b illustrates a cross-sectional view of an article of the invention comprising exterior film covering 436, vibration attenuating material 438, and pressure sensitive adhesive layer 442. The vibration attenuating material contains high modulus filler particles 440.

Figure 10C:
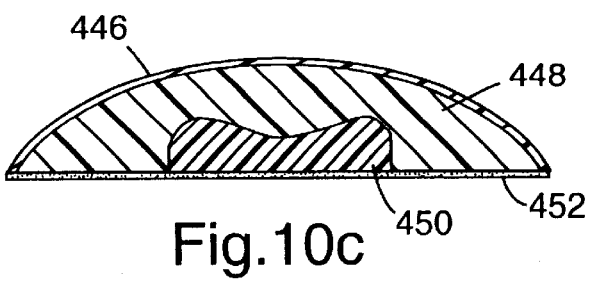

FIG. 10c illustrates a cross-sectional view of an article of the invention comprising exterior film covering 446 vibration attenuating material 448, and pressure sensitive adhesive layer 452. The vibration attenuating material contains high modulus filler object 450.

Figure 11:
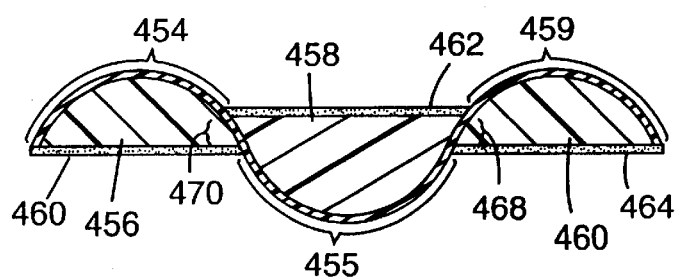
FIG. 11 illustrates a cross-sectional view of an embodiment of the articles of the invention.

FIG. 11 illustrates a cross-sectional view of the article of the invention comprising exterior film covering comprising film segments 454, 455, and 459, vibration attenuating material 456, 458, and 460, and pressure sensitive adhesive layers 460, 462, and 464, and interior film dividers 470 and 468. The same continuous film functions as part of the exterior film covering (segments 455, 454 and 459) and in other areas of the article as the interior film divider (segments 470 and 468).

Method of Making the Article of the Invention

The article of the invention can be prepared by a number of methods such that vibration attenuating material is at least partially enclosed by an exterior film covering.

A specific article of the invention can be made, for example, by providing two layers of a desired film (typically a polymeric film such as a polyethylene or polyester film) of the same dimensions, heat sealing the edges of the films together on three sides to form a bag, filling the bag with an uncured vibration attenuating material, sealing the films along the remaining side of the bag, thus enclosing the vibration attenuating material in a "pillow" and optionally curing the vibration attenuating material by appropriate means such as by subjecting the sealed bag to heat or radiation, for example. An initiator can be added to the vibration attenuating material prior to cure if desired. The resultant article can optionally have an adhesive applied to one or more sides to facilitate application of the article to a surface.

Another method of making a specific article of the invention, for example, is by blow molding a film (such as a polymeric film, for example) into a desired shape, removing the shaped film from the mold, and filling the shaped film with an uncured vibration attenuating material. The vibration attenuating material can be optionally cured by a number of methods, such as those described above. An additional film layer(s) and/or film segment(s) may optionally be laminated over some or all of the exposed vibration attenuating material. An adhesive layer may optionally be coated over some or all of the film coating and/or optionally an adhesive may be coated on some or all of any exposed vibration attenuating material.

A layer of adhesive (such as a pressure sensitive adhesive) may be coated on an outer surface of the exterior film covering of the article and/or on an exposed surface of vibration attenuating material. Optionally a layer of adhesive may be coated on at least a portion of an inner surface of the exterior film covering prior to addition of the vibration attenuating material. In addition a layer of adhesive may be coated on at least a portion of one or both surfaces of an interior film divider which separates one area of vibration attenuating material from another. An interior divider may be included in the article by, for example, first forming a molded exterior film covering, filling the molded exterior covering partially with a vibration attenuating material, inserting a layer of a different film over the vibration attenuating material which will serve as the interior film divider, adding a layer of a different vibration attenuating material over the interior film divider, followed by cure, and optionally a layer of adhesive over the exposed vibration attenuating material. Particulate and other additives may optionally be added to the vibration attenuating material prior to enclosing with the exterior film cover although in some situations they may be added to the vibration attenuating material after it is inserted into a molded exterior film covering, for example. The vibration attenuating material when only partially enclosed by the exterior film covering must not be in a liquid state such that it can flow out of its enclosure. The vibration attenuating material is thus typically a solid or gel which is bonded to the exterior film covering, typically due to the possible adhesive nature of the vibration attenuating material although this may be due to a separate adhesive which may optionally be used to bond the vibration attenuating material to the exterior film covering. These methods and articles described are not meant to be limiting.

Uses of the Articles of the Invention

The articles of the invention can be used for numerous applications. Examples of suitable applications include, for structures selected from the group consisting of disk drive assemblies, optical disk drives, compact disk assemblies, appliances, transport vehicles, automobiles, doors, drawers, hoods, computers, printed circuit boards, and test equipment.

The article of the invention can, for example, be placed with, on or within a structure to be attenuated. The article may be adhered to the structure via an adhesive. Alternatively it may be placed or wedged in its place of use without an adhesive if the structure of the article is conducive to such placement. Other methods of placement are also possible.

The shape of the article of the invention, selection of polymeric or non-polymeric films, selection of vibration attenuating material(s), additives, etc. are all based on the end use performance and environmental requirements of the article.

The article of the invention can be as thin or as thick as needed for a given application.

For most applications the article has a thickness of about 0.025 to 50 mm, preferably about 0.125 to 25 mm, and most preferably about 0.125 to about 17.5 mm, For most applications the article has a width of about 1.25 to 75 mm, preferably about 2.5 mm to 50 mm, and most preferably about 5 mm to about 37.5 mm. For most applications the article has a length of about 1.25 mm to 75 mm, preferably about 2.5 to 50 mm, and most preferably about 1.35 to about 37.5 mm.

For most applications the article has an exterior film covering with a thickness of about 0.005 to 1.25 mm, preferably about 0.025 to 0.75 mm, and most preferably about 0.025 to about 0.375 mm.

When present, an interior film divider typically has a thickness of about 0.005 to about 1.25 mm, preferably about 0.005 to about 0.075 mm, most preferably about 0.01 to about 0.375 mm.

For a typical disk drive application for damping a voice coil motor between the top magnet plate and the disk drive cover, the exterior film covering typically ranges from about 0.0127 mm (0.5 mil) thickness to about 0.508 to 0.762 (20 to 30 mils) thickness, preferably about 0.025 mm(1 mil) to 0.25 mm(10 mils), and most preferably about 0.025 mm(1 mil) to about 0.178(7 mils) thickness. The vibration attenuating material thickness is dependent upon the particular application. For a typical disk drive application, the vibration attenuating material nominal thickness (assuming a basic truncated flat top/flat bottom pyramid shape damper) is typically in the range from about 0.0127 mm (0.5 mil) thickness to about 12.7 mm (500 mils) thickness. Most applications typically require a damper design with a damping material thickness of about 0.25 mm (10 mil) to about 5 mm (200 mils).

Preferably the vibration attenuating material has a glass transition temperature of less than about 60° C. at 1 Hz., more preferably less than about 45° C. at 1 Hz, and most preferably less than about 38° C. at 1 Hz.

The overall geometry of the article of the invention will vary with the degree of vibration attenuation required for an application. For a typical disk drive, and for a vibration attenuating article applied between the top magnet plate of the actuator motor and the top cover and that is designed to have a truncated (flat top)/flat bottom pyramid shape, and where the top of the damper is from 50–80% of the surface area of the bottom of the article, the top of the article will have a top flat surface area that ranges from about 6.45 square mm (0.1" squared) to 2581 square mm (2" squared). The damper for this application is also under a degree of compression, typically ranging from about 0.5% to 50% after installation.

EXAMPLE

The invention has been described with reference to various specific and preferred embodiments and will be further described by reference to the following detailed example. It is understood, however, that there are many extensions, variations, and modifications on the basic theme of the present invention beyond that shown in the example and detailed description, which are within the spirit and scope of the present invention.

Example 1

Single Layer Damper:

A 0.10 mm thick amorphous polyester film was set over a heat resistant mold and heated to allow the film to take the shape of the mold. The shape of the mold was a truncated pyramid measuring 12 mm×12 mm at the base, approximately 8 mm×8 mm at the top, and approximately 4 mm thick. The shaped film was removed from the mold and filled with a partially photopolymerized mixture of by weight:

41 parts of isooctyl acrylate 59 parts of isobornyl acrylate 0.04 part of 2,2-dimethoxy-2-phenyl acetophenone which was obtained as Irgacure™651 from Ciba Geigy.

The partial photopolymerizing of the mixture was accomplished in an inert (nitrogen) atmosphere using a bank of 40-watt fluorescent black lights to provide a syrup of a viscosity (Brookfield) of about 3000 cps. Prior to filling the shaped film, 0.22 part of hexane diol diacrylate and an additional 0.12 part of "Irgacure" 651 were added to the partially polymerized mixture. A 0.025 mm thick film of 3M Scotchdamp™ ISD-262 acrylic polymer on a 0.05 mm thick polyester release liner was laminated to the 12 mm×12 mm base of the truncated pyramid shaped film with the partially polymerized mixture in intimate contact with the Scotchdamprm ISD-262 polymer. The filled shaped film was irradiated with the same fluorescent lamps for 10 minutes to complete the polymerization of the partially polymerized mixture. The polyester release liner was then removed. The resulting article was a single layer attenuator ready for testing.

Comparative Example 1

Current Generation Damper Design

A damper currently available from 3M and used for a disk drive actuator application is designated as follows:

Two Part Damper Design:

Part one: Approximately 4 mm thick ISD-110 damping material with 0.05 mm ISD-112 damping material layer attached on the base and approximately 15 mm×15 mm length and width die cut rectangle.

Part two: 28 mm×28 mm die cut part of 3M VC-134 polyethylene release film 0.016 mm with a 0.04 mm thick acrylic pressure sensitive adhesive on one surface.

The Example 1 and the Comparative Example 1 dampers as prepared above were tested in the following configurations:

Configuration 1—The disk drive cover of the designated test drive was removed. One of the Examples 1 dampers was attached to the top surface of the magnetic plate of the actuator motor so that the base of the damper was in contact with the plate. It was attached such that when the cover was reattached, the damper would be compressed by at least 1 percent of the dampers total thickness.

Configuration 2—The same as Configuration 1 except that two Example 1 dampers were attached side by side on the top surface of the magnetic plate.

Configuration 3—The same as Configuration 1 except that one Comparative Example 1 damper was used in the drive. Part one was attached to the top surface of the magnetic plate and Part two was attached to the inner surface of the drive cover via its adhesive in a position which allowed its adhesive free side to directly contact Part one when the cover was reattached.

Configuration 4—The disk drive without using any damper.

The disk drive cover of the designated test drive was removed. One or two Example 1 and Comparative Example 1 dampers were added to the top portion of the actuator motor on the top magnet plate. The dampers were specifically attached to the magnet plate of the actuator motor such that when the cover was reattached, the damper would be compressed by at least 1% of the dampers total thickness for all designs. The drive was tested at 20–30° C. in an acoustic chamber.

The drive was then placed into a test room for acoustic measurements and started. The drive reached the desired operating spindle speed and a computer connected to the disk drive sent instructions to the drive to allow the actuator motor to do random movements moving the read-write heads quickly over a series of data or servo tracks. This movement of the actuator created vibrations in the actuator assembly and other areas of the drive, leading to acoustical noise above the levels when the actuator in the drive is not operating. Adding a damper to the actuator assembly for this test between the cover and actuator reduced this noise.

Monitoring the acoustical levels of the drive was a microphone (placed approximately 2 feet from the drive) attached to a Brüel and Kjaer frequency analyzer. The test measured the noise in dBA over a frequency range in Hz. This tester allowed collection of data for the relative acoustical performance of the drive with no actuator dampers and the Example 1 and Comparative Example 1 dampers. Results are reported in the table below. Configuration 1 is identified in the table as "1×Example Damper", Configuration 2 is identified in the table as "2×Example Damper", Configuration 3 is identified in the table as "Comparative Example Damper", and Configuration 4 is identified in the table as "No Damper".

| FREQUENCY | Comparative Example Damper | 1 × Example Damper | 2 × Example Damper | No Damper |
| --- | --- | --- | --- | --- |
| 200 | 2.09 | 13.55 | 12.28 | 30.13 |
| 250 | 17.07 | 20.25 | 19.43 | 19.66 |
| 315 | 11.48 | 16.49 | 17.07 | 17.50 |
| 400 | 15.90 | 19.90 | 16.86 | 17.92 |
| 500 | 23.05 | 23.40 | 20.15 | 21.54 |
| 630 | 26.20 | 26.20 | 21.61 | 24.62 |
| 800 | 24.46 | 23.54 | 17.92 | 22.93 |
| 1000 | 24.76 | 28.88 | 25.87 | 30.36 |
| 1250 | 29.89 | 33.30 | 33.18 | 40.05 |
| 1600 | 25.47 | 27.33 | 26.46 | 40.43 |
| 2000 | 30.83 | 30.34 | 29.37 | 35.82 |
| 2500 | 32.34 | 32.95 | 29.19 | 28.41 |
| 3150 | 27.47 | 28.53 | 27.37 | 30.29 |
| 4000 | 32.57 | 37.61 | 30.88 | 37.13 |

-continued

| FREQUENCY | Comparative Example Damper | 1 × Example Damper | 2 × Example Damper | No Damper |
|---|---|---|---|---|
| 5000 | 31.91 | 34.10 | 32.78 | 30.57 |
| 6300 | 20.39 | 18.65 | 18.11 | 22.18 |
| 8000 | 19.66 | 21.73 | 18.04 | 21.99 |
| 10000 | 14.53 | 15.05 | 12.51 | 14.89 |
| 12500 | 13.03 | 13.95 | 12.30 | 13.15 |
| 16000 | 12.35 | 10.49 | 9.43 | 11.90 |
| 200000 | 9.90 | 6.07 | 5.53 | 8.70 |

The data in the above table shows that the dampers of the invention have excellent damping performance as compared to the comparative damper example. Either one or two smaller Example 1 dampers provided nearly the same damping benefit or improved performance as compared to the larger comparative damper. So, in addition to the benefits associated with the example dampers design for environmental protection, cleanability, one piece design, etc., the example dampers have excellent damping performance.

The foregoing detailed description and examples have been given for clarity of understanding only. No unnecessary limitations are to be understood therefrom. The invention is not limited to the exact details shown and described, for variations obvious to one skilled in the art will be included within the invention defined by the claims. Varying damper designs may also provide for better damping results than shown by the above example.

Example 2
Outgassing Evaluation

In order to demonstrate the improved outgassing performance of the novel dampers as compared to control dampers not having an exterior film covering, sample dampers of the invention w ere prepared an d tested for outgassing performance.

Four single layer dampers were prepared as described in Example 1. The polyester outer film was removed from two of the dampers leaving just the visco elastic damping polymer in the shape of the truncated pyramid in order to provide the Control Samples. The remaining two dampers with their coverings intact were identified as the Ex. 1 dampers.

Testing was done by placing the dampers in separate clean preweighed aluminum pans with the base of the damper in contact with the bottom surface of the test pan. The dampers were weighed on a scale in the test pans and then placed into a Class 100 Cleanroom convection oven that had been preheated to the desired test temperature, 150° C. After 2 hours in the oven, the samples were removed from the oven, placed into a dessicator for 30 minutes to allow to cool and stabilize, and then reweighed to determine the weight loss of each sample.

The average weight loss of the 2 samples for each condition are showed in the following table.

| Samples | % Weight Loss |
|---|---|
| Control | 0.336 |
| Ex. 1 | 0.167 |

The data for the outgassing weight loss shows that that the samples of the invention have improved outgassing performance as the % weight loss is less than the samples of the control. The above data shows that the novel damper design of the invention does provide for an improved outgassing design as compared to the Control Samples, for example as the part is used for disk drive applications.

The foregoing detailed description and examples have been given for clarity of understanding only. No unnecessary limitations are to be understood therefrom. The invention is not limited to the exact details shown and described, for variations obvious to one skilled in the art will be included within the invention defined by the claims. Varying damper designs may also provide for better outgassing results than shown by the above example.

It is claimed:

1. An article comprising:
   (a) a vibration attenuating material, wherein the vibration attenuating material has a storage modulus greater than about $6.9 \times 10^3$ Pascals and a loss factor greater than about 0.01 at 25° C. and 1 Hertz, wherein the vibration attenuating material has a surface and an interior,
   (b) an exterior film covering, wherein the exterior firm covering film has a tensile modulus greater than about $6.9 \times 10^3$ Pascals at 25° C. and 50% relative humidity, wherein the exterior film covering comprises one or more of the following:
      (i) a film;
      (ii) a film segment;
   wherein the vibration attenuating material surface is completely enclosed by the exterior film covering or partially enclosed except for one flat surface by the exterior film covering;
   wherein an inner surface of the exterior film covering conforms to the surface of the vibration attenuating material that it is at least partially enclosing;
   wherein at least a portion of the surface of the enclosed vibration attenuating material has a three dimensional shape; and
   wherein the exterior film covering has a thickness of about 0.005 to about 1.25 mm;
   (c) optionally one or more interior film dividers, wherein each interior film divider has a tensile modulus greater than about $6.9 \times 10^3$ Pascals at 25° C. and 50% relative humidity, wherein each interior film divider comprises one or more of the following:
      (i) a film;
      (ii) a film segment;
   wherein each interior film divider separates at least a portion of the vibration attenuating material from another portion of the vibration attenuating material; and
   (d) optionally a layer of adhesive coated on one or more of the following:
      (i) at least a portion of a surface of the exterior film covering;
      (ii) at least a portion of a surface of any interior film divider, if present,
      (iii) at least a portion of any vibration attenuating material which is not enclosed by the exterior film covering;
   wherein when the vibration attenuating material is completely enclosed by the exterior firm covering a layer of adhesive must be coated on at least a portion of an outer surface of the exterior film covering; and
   wherein the article is capable of being compressed 1–40 percent.

2. The article of claim 1 wherein at least one adhesive layer is present.

3. The article of claim 1 wherein the vibration attenuating material is completely enclosed by the exterior film covering.

4. The article of claim 1 wherein the vibration attenuating material is partially enclosed by the exterior film covering and about 50 to about 99 percent of the surface of the vibration attenuating material is enclosed by the exterior film covering.

5. The article of claim 1 wherein the vibration attenuating material is partially enclosed by the exterior film covering and about 60 to about 90 percent of the surface of the vibration attenuating material is enclosed by the exterior film covering.

6. The article of claim 1 wherein the vibration attenuating material is partially enclosed by the exterior film covering and about 65 to about 85 percent of the surface of the vibration attenuating material is enclosed by the exterior film covering.

7. The article of claim 1 wherein the vibration attenuating material is partially enclosed by the exterior film covering except for one flat surface of the vibration attenuating material.

8. The article of claim 1 wherein the vibration attenuating material is partially enclosed by the exterior film covering except for one flat surface of the vibration attenuating material and wherein an adhesive layer is present which is coated over the flat surface which is not enclosed by the exterior film covering.

9. The article of claim 1 wherein the vibration attenuating material is in the shape of a polyhedron.

10. The article of claim 1 wherein the vibration attenuating material has a shape selected from the group consisting of cubes, rings, pyramids, prisms, truncated pyramids, stepped pyramids, stepped rectangles, cylinders, cones, spheres, hemispheres, and pillows.

11. The article of claim 1 wherein the exterior film covering comprises film layer(s) and/or film segment(s) each independently selected from the group consisting of crystalline polyester, amorphous polyester, polyimide, polyamide, polyethylene, polypropylene, acrylic, phenolic, polyvinyl chloride, polyurethane, polystyrene, fluorinated polymer films, polyvinyl acetates, and nylon.

12. The article of claim 1 wherein the vibration attenuating material is selected from the group consisting of urethane rubbers, silicone rubbers, nitrile rubbers, butyl rubbers, acrylic rubbers, natural rubbers, styrene-butadiene rubbers, polyesters, polyurethanes, polyamides, ethylene-vinyl acetate copolymers, polyvinyl butyral, polyvinyl butyral-polyvinyl acetate copolymers, epoxy-acrylate interpenetrating networks, polyacrylates, polycarbonates, polyetherimides, polyesters, polysulfones, polystyrenes, acrylonitrile-butadiene-styrene block copolymers, polypropylenes, acetal polymers, polyamides, polyvinyl chlorides, polyethylenes, and combinations thereof.

13. An article comprising two or more of the articles of claim 1 joined together through their exterior film coverings.

14. An article comprising two or more of the articles of claim 1 adhered together.

15. The article of claim 1 wherein at least one interior film divider is present.

16. The article of claim 1 wherein at least two chemically different types of vibration attenuating material are present.

17. The article of claim 1 wherein the vibration attenuating material has a glass transition temperature of less than about 60° C. at 1 Hz.

18. The article of claim 1 wherein the vibration attenuating material has a glass transition temperature of less than about 45° C. at 1 Hz.

19. The article of claim 1 wherein the vibration attenuating material has a glass transition temperature of less than about 38° C. at 1 Hz.

20. The article of claim 1 wherein the article has a thickness of about 0.025 to about 50 mm, a length of about 1.25 to about 75 mm, and a width of about 1.25 to about 75 mm.

21. The article of claim 1 wherein the exterior film covering has one or more features selected from the group consisting of holes, slits, impressions, and protrusions.

22. The article of claim 1 wherein at least one interior film divider is present which has one or more features present selected from the group consisting of holes, slits, impressions, and protrusions.

23. The article of claim 1 wherein the interior film divider comprises film layer(s) and/or film segment(s) each independently selected from the group consisting of crystalline polyester, amorphous polyester, polyimide, polyamide, polyethylene, polypropylene, acrylic, phenolic, polyvinyl chloride, polyurethane, polystyrene, fluorinated polymer films, polyvinyl acetates, and nylon.

24. The article of claim 1 wherein at least one interior film divider comprises film layer(s) and/or film segment(s) which are non-woven materials.

25. The article of claim 1 wherein at least one exterior film covering comprises film layer(s) and/or film segment(s) which are non-woven materials.

26. The article of claim 1 wherein the exterior film covering has been subjected to one or more of the following: (i) corona treatment; (ii) metalization.

27. The article of claim 1 wherein the exterior film covering has multiple layers, wherein at least two of the layers have differing chemical compositions.

28. The article of claim 1 wherein at least one interior film divider has multiple layers, wherein at least two of the layers have differing chemical compositions.

29. The article of claim 1 wherein the vibration attenuating material comprises one or more additives selected from the group consisting of particulate, fibers, and objects.

30. The article of claim 1 wherein the interior film divider has a thickness of about 0.005 to about 1.25 mm.

31. A structure having an attenuating article positioned in relation to the structure such that the attenuating article is capable of attenuating the vibration of the structure in at least one vibrational mode, wherein the article comprises (a) a vibration attenuating material, wherein the vibration attenuating material has a storage modulus greater than about $6.9 \times 10^3$ Pascals and a loss factor greater than about 0.01 at 25° C. and 1 Hertz, wherein the vibration attenuating material has a surface and an interior;

(b) an exterior film covering, wherein the exterior film covering film has a tensile modulus greater than about $6.9 \times 10^3$ Pascals at 25° C. and 50% relative humidity, wherein the exterior film covering comprises one or more of the following:
(i) a film;
(ii) a film segment;
wherein the vibration attenuating material surface is completely enclosed by the exterior film covering or partially enclosed except for one flat surface by the exterior film covering;
wherein an inner surface of the exterior film covering substantially conforms to the surface of the vibration attenuating material that it is at least partially enclosing;
wherein at least a portion of the surface of the enclosed vibration attenuating material has a three dimensional shape; and wherein the exterior film covering has a thickness of about 0.005 to about 1.25 mm;

(c) optionally one or more interior film dividers, wherein each interior film divider has a tensile modulus greater than about $6.9 \times 10^3$ Pascals at 25° C. and 50% relative humidity, wherein each interior film divider comprises one or more of the following:
  (i) a film;
  (ii) a film segment;
wherein each interior film divider separates at least a portion of the vibration damping material from another portion of the vibration damping material; and (d) optionally a layer of adhesive coated on one or more of the following:
  (i) at least a portion of a surface of the exterior film covering;
  (ii) at least a portion of a surface of any interior film divider, if present;
  (iii) at least a portion of any vibration attenuating material which is not enclosed by the exterior film covering; and
wherein the article is capable of being compressed 1–40 percent.

* * * * *

UNITED STATES PATENT AND TRADEMARK OFFICE
CERTIFICATE OF CORRECTION

| | |
|---|---|
| PATENT NO. | : 6,251,493 B1 |
| DATED | : June 26, 2001 |
| INVENTOR(S) | : Gordon G. Johnson, Michael A. Jung, Donald T. Landin and Jeffrey W. Mccutheon |

It is certified that error appears in the above-identified patent and that said Letters Patent is hereby corrected as shown below:

Column 2,
Line 47, delete "such as", $2^{nd}$ occurrence.

Column 15,
Line 57, "360" should read -- 3-60 --.

Column 18,
Line 12, insert -- ), -- following "115".

Column 23,
Lines 41-42, "Scotchdamprm" should read -- Scotchdamp $^{tm}$ --.

Column 25,
Line 37, "w ere" should read -- were -- "and" " " -- and --.
Line 65, delete "that", $2^{nd}$ occurrence.

Column 26,
Line 20, "firm" should read -- film --.
Line 61, "firm" should read -- film --.

Signed and Sealed this

Eleventh Day of June, 2002

Attest:

JAMES E. ROGAN
Director of the United States Patent and Trademark Office

Attesting Officer